(12) United States Patent
Kim et al.

(10) Patent No.: US 10,707,485 B2
(45) Date of Patent: Jul. 7, 2020

(54) NICKEL-BASED ACTIVE MATERIAL FOR LITHIUM SECONDARY BATTERY, METHOD OF PREPARING THE SAME, AND LITHIUM SECONDARY BATTERY INCLUDING POSITIVE ELECTRODE INCLUDING THE NICKEL-BASED ACTIVE MATERIAL

(71) Applicant: Samsung SDI Co., Ltd., Yongin-si, Gyeonggi-do (KR)

(72) Inventors: Jongmin Kim, Yongin-si (KR); Jiyoon Kim, Yongin-si (KR); Pilsang Yun, Yongin-si (KR); Donggyu Chang, Yongin-si (KR); Kwanghwan Cho, Yongin-si (KR); Jangsuk Hyun, Yongin-si (KR); Jinhwa Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 15/654,648

(22) Filed: Jul. 19, 2017

(65) Prior Publication Data
US 2018/0026268 A1    Jan. 25, 2018

(30) Foreign Application Priority Data

Jul. 20, 2016   (KR) .................. 10-2016-0092243
Nov. 30, 2016   (KR) .................. 10-2016-0162291

(51) Int. Cl.
*H01M 4/525*    (2010.01)
*C01G 53/00*    (2006.01)
(Continued)

(52) U.S. Cl.
CPC .......... *H01M 4/525* (2013.01); *C01G 53/006* (2013.01); *C01G 53/42* (2013.01); *C01G 53/50* (2013.01);
(Continued)

(58) Field of Classification Search
CPC ................................. H01M 4/00; C01G 53/00
See application file for complete search history.

(56) References Cited

U.S. PATENT DOCUMENTS 8,486,564 B2   7/2013  Nagai et al.
8,728,666 B2   5/2014  Itou et al.
(Continued)

FOREIGN PATENT DOCUMENTS

CN   105070896 A   11/2015
EP   2882013 A1   6/2015
(Continued)

OTHER PUBLICATIONS

Kim et al., "A New Coating Method for Alleviating Surface Degradation of $LiNi_{0.6}Co_{0.2}Mn_{0.2}O_2$ Cathode Material: Nanoscale Surface Treatment of Primary Particles," Nano Letters, Feb. 2015, pp. 2111-2119, DOI: 10.1021/acs.nanolett.5b00045.
(Continued)

*Primary Examiner* — James Lee
(74) *Attorney, Agent, or Firm* — Lewis Roca Rothgerber Christie LLP

(57) ABSTRACT

Provided are a nickel-based active material, a method of preparing the same, and a lithium secondary battery including a positive electrode including the nickel-based active material. The nickel-based active material includes at least one secondary particle including an aggregate of two or more primary particles, wherein at least a portion of the secondary particle has a radial array structure, and a heteroelement compound is positioned between the primary particles.

15 Claims, 30 Drawing Sheets

(51) Int. Cl.
   *H01M 4/505*   (2010.01)
   *H01M 4/485*   (2010.01)
   *H01M 10/052*   (2010.01)
   *H01M 4/02*   (2006.01)

(52) U.S. Cl.
   CPC .......... *H01M 4/485* (2013.01); *H01M 4/505* (2013.01); *C01P 2002/72* (2013.01); *C01P 2002/85* (2013.01); *C01P 2004/03* (2013.01); *C01P 2004/50* (2013.01); *C01P 2004/61* (2013.01); *C01P 2004/84* (2013.01); *C01P 2004/90* (2013.01); *C01P 2006/12* (2013.01); *C01P 2006/14* (2013.01); *C01P 2006/16* (2013.01); *C01P 2006/40* (2013.01); *H01M 10/052* (2013.01); *H01M 2004/021* (2013.01); *H01M 2004/028* (2013.01)

(56) References Cited

U.S. PATENT DOCUMENTS

| | | | |
|---|---|---|---|
| 9,450,229 | B2 | 9/2016 | Uwai et al. |
| 9,899,674 | B2 | 2/2018 | Hirai et al. |
| 2009/0029253 | A1 | 1/2009 | Itou et al. |
| 2014/0087265 | A1 | 3/2014 | Yura et al. |
| 2014/0205898 | A1 | 7/2014 | Lee et al. |
| 2014/0335417 | A1 | 11/2014 | Nagai |
| 2015/0064557 | A1 | 3/2015 | Kim et al. |
| 2015/0086787 | A1 | 3/2015 | Yura et al. |
| 2015/0093580 | A1 | 4/2015 | Kobayashi et al. |
| 2016/0036041 | A1 | 2/2016 | Uwai et al. |
| 2016/0181597 | A1 | 6/2016 | Kim et al. |
| 2016/0190573 | A1 | 6/2016 | Sun et al. |
| 2017/0222221 | A1* | 8/2017 | Park ................ H01M 4/505 |
| 2018/0108940 | A1* | 4/2018 | Kwon ................ H01M 4/131 |
| 2018/0219216 | A1 | 8/2018 | Choi et al. |

FOREIGN PATENT DOCUMENTS

| | | |
|---|---|---|
| EP | 2975680 A1 | 1/2016 |
| EP | 3272710 A1 | 1/2018 |
| JP | 2001-243951 | 9/2001 |
| JP | 2015-72800 A | 4/2015 |
| JP | 2015-76397 | 4/2015 |
| JP | 2016-004703 A | 1/2016 |
| KR | 10-2009-0126962 | 12/2009 |
| KR | 10-2010-0099337 | 9/2010 |
| KR | 10-2014-0093529 | 7/2014 |
| KR | 10-2015-0016125 | 2/2015 |
| KR | 10-2015-0026863 A | 3/2015 |
| KR | 10-2015-0090963 A | 8/2015 |
| KR | 10-2015-0119876 A | 10/2015 |
| KR | 10-2015-0122172 A | 10/2015 |
| KR | 10-2016-0041039 | 4/2016 |
| KR | 10-2016-0049995 A | 5/2016 |
| WO | WO 2015/108163 A1 | 7/2015 |
| WO | WO 2016/060451 A1 | 4/2016 |
| WO | WO-2016068594 A1 * | 5/2016 ............ H01M 4/505 |

OTHER PUBLICATIONS

Noh et al., "Cathode Material with Nanorod Structure—An Application for Advanced High-Energy and Safe Lithium Batteries," Chemistry of Materials, May 2013, vol. 25, pp. 2109-2115.
EPO Extended Search Report dated Nov. 14, 2017, for corresponding European Patent Application No. 17182400.6 (7 pages).
Lim et al., "Advanced Concentration Gradient Cathode Material with Two-Slope for High-Energy and Safe Lithium Batteries," Advanced Functional Materials, 2015, vol. 25, pp. 4673-4680.
Zheng, Zhuo et al., "Uniform Ni-rich $LiNi_{0.6}Co_{0.2}Mn_{0.2}O_2$ Porous Microspheres: Facile Designed Synthesis and Their Improved Electrochemial Performance," Electrochimica Acta, vol. 191, 2016, pp. 401-410.
EPO Extended Search Report dated Dec. 4, 2017, for corresponding European Patent Application No. 17182408.9 (9 pages).
Japanese Office Action dated Aug. 6, 2018, for corresponding Japanese Patent Application No. 2017-140741 (4 pages).
EPO Extended Search Report dated Mar. 29, 2018, corresponding to European Patent Application No. 17206091.5 (7 pages).
Japanese Office Action, for Patent Application No. JP 2017-236042, dated Jan. 11, 2019, 4 pages.
U.S. Office Action dated Mar. 8, 2019, issued in U.S. Appl. No. 15/654,623 (11 pages).
European Patent Office Action for corresponding European Application No. 17 206 091.5, dated Jun. 18, 2019, 4 pages.
Office Action issued in U.S. Appl. No. 15/836,311 by the USPTO, dated Nov. 29, 2019, 9 pages.
Office Action issued in U.S. Appl. No. 15/654,623 by the USPTO, dated Feb. 12, 2020, 15 pages.
Korean Office Action dated Dec. 9, 2019, corresponding to Korean Patent Application No. 10-2017-0167526 (98 pages).
Chinese Patent Office Action with English Translation for corresponding Chinese Patent Application No. 20170595368.0, dated Mar. 26, 2020, 25 pages.

* cited by examiner (A)  (B)  (C)

NICKEL-BASED ACTIVE MATERIAL FOR LITHIUM SECONDARY BATTERY, METHOD OF PREPARING THE SAME, AND LITHIUM SECONDARY BATTERY INCLUDING POSITIVE ELECTRODE INCLUDING THE NICKEL-BASED ACTIVE MATERIAL

CROSS-REFERENCE TO RELATED APPLICATIONS

This application claims priority to and the benefit of Korean Patent Application Nos. 10-2016-0092243, filed on Jul. 20, 2016, and 10-2016-162291, filed on Nov. 30, 2016, in the Korean Intellectual Property Office, the entire content of each of which is incorporated herein by reference.

BACKGROUND

1. Field

One or more aspects of embodiments of the present disclosure relate to a nickel-based active material for a lithium secondary battery, a method of preparing the same, and a lithium secondary battery including a positive electrode including the nickel-based active material.

2. Description of the Related Art

As portable electronic devices and communication devices are developed, there is a high need for development of a lithium secondary battery having a high energy density.

A lithium nickel manganese cobalt composite oxide, a lithium cobalt oxide, or the like may be used as a positive active material in a lithium secondary battery. However, when such a positive active material is used, cracks may be formed in the positive active material as charge/discharge cycling is repeated. As a result, a lithium secondary battery containing such a material may have a shorter long-term lifespan, higher resistance, and unsatisfactory capacity characteristics. Therefore, improvements in positive active materials are desirable.

SUMMARY

One or more aspects of embodiments of the present disclosure are directed toward a nickel-based active material for a lithium secondary battery and a method of preparing the nickel-based active material, the lithium secondary battery having improved lifespan characteristics and reduced battery resistance due to suppression or reduction of crack formation during charge/discharge cycling.

One or more aspects of embodiments of the present disclosure are directed toward a lithium secondary battery including a positive electrode including the nickel-based active material, the lithium secondary battery exhibiting improved cell performance.

Additional aspects will be set forth in part in the description which follows and, in part, will be apparent from the description, or may be learned by practice of the presented embodiments.

One or more example embodiments of the present disclosure provide a nickel-based active material for a lithium secondary battery including at least one secondary particle comprising an aggregate of two or more primary particles, wherein at least a portion of the secondary particle has a radial alignment structure, and a hetero-element compound is positioned between the primary particles.

In some embodiments, the hetero-element compound is a compound containing at least one hetero-element selected from zirconium (Zr), titanium (Ti), aluminum (Al), magnesium (Mg), tungsten (W), phosphorus (P), and boron (B). For example, the hetero-element compound may be an oxide including at least one hetero-element selected from Zr, Ti, Al, Mg, W, P, and B.

In some embodiments, an interior portion of the secondary particle of the nickel-based active material has a larger pore size than an outer portion of the secondary particle.

One or more example embodiments of the present disclosure provide a method of preparing a nickel-based active material for a lithium secondary battery, the method including:

obtaining a nickel-based active material particle A by performing a first heat treatment on a mixture of a lithium precursor and metal hydroxide in an oxidative gas atmosphere; and mixing a raw material containing the nickel-based active material particle A with a hetero-atom and performing a second heat treatment thereon, wherein the second heat treatment is performed at a higher temperature than the first heat treatment, and the prepared nickel-based active material includes at least one secondary particle comprising an aggregate of two or more primary particles, wherein at least a portion of the secondary particle has a radial alignment structure.

One or more example embodiments of the present disclosure provide a lithium secondary battery including a positive electrode including the nickel-based active material, a negative electrode, and an electrolyte between the positive electrode and the negative electrode.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Figure 1A:
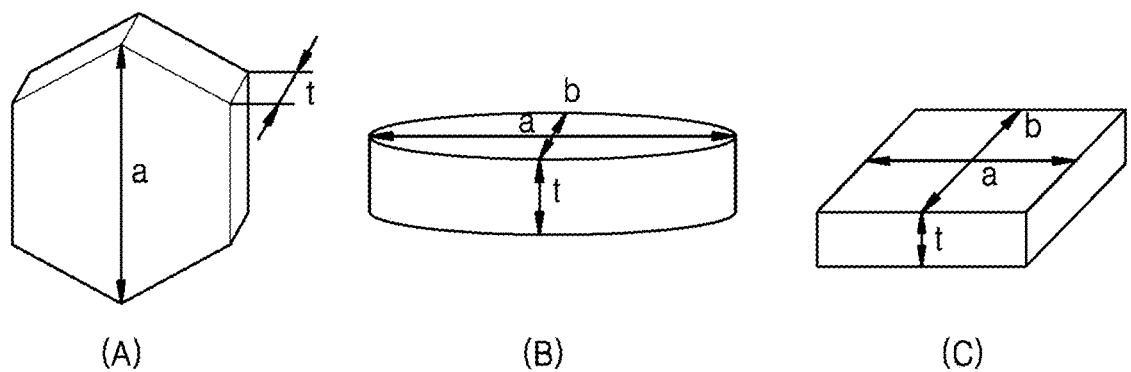
FIG. 1A is a schematic view of plate particle shapes (A), (B), and (C)

Reference will now be made in more detail to embodiments, examples of which are illustrated with respect to a nickel-based active material for a lithium secondary battery, a method of preparing the nickel-based active material, a positive electrode including the nickel-based active material, and a lithium secondary battery including the positive electrode in the accompanying drawings.

Like reference numerals refer to like elements throughout and duplicative descriptions thereof may not be provided. In this regard, the present embodiments may have different forms and should not be construed as being limited to the descriptions set forth herein. Accordingly, the embodiments are merely described below, by referring to the drawings, to explain aspects of the present description. As used herein, the term "and/or" includes any and all combinations of one or more of the associated listed items. Expressions such as "at least one of", "one of", "selected from", "at least one selected from", and "one selected from" when preceding a list of elements, modify the entire list of elements and do not modify the individual elements of the list.

One or more aspects of embodiments of the present disclosure provides a nickel-based active material for a lithium secondary battery, wherein the nickel-based active material includes at least one secondary particle including an aggregate of two or more primary particles, at least a portion of the secondary particle has a radial alignment structure, and a hetero-element compound is positioned between the primary particles.

The term "primary particle" is used herein in its art-recognized sense to refer to the smallest particle type or form that can be identified in a material. The term "secondary particle" is used herein in its art-recognized sense to refer to the next smallest particle type or form, which is formed as an assembly or an agglomerate of two or more primary particles. The term "active material" used herein refers to a battery material having a particular composition and crystal structure that renders it suitable for intercalating and deintercalating lithium ions. The terms "primary particle" and "secondary particle" may be used to describe the term "active material" to refer to the physical morphology of a sample of the active material.

The hetero-element compound may be included at or along a grain boundary of adjacent primary particles and/or on the surface of a primary particle. The term "a hetero-element compound coated on primary particles" used herein refers to a case in which a hetero-element compound is included in the particle at one of these positions.

The hetero-element compound is a compound containing a hetero-element that may be selected from zirconium (Zr), titanium (Ti), aluminum (Al), magnesium (Mg), tungsten (W), phosphorus (P), and boron (B). The hetero-element compound may simultaneously include lithium (Li) and a hetero-element. The hetero-element may be included in an amount of about 0.0005 mol to about 0.03 mol, for example, about 0.001 mol to about 0.01 mol, based on 1 mol of the transition metal of the nickel-based active material.

In some embodiments, the nickel-based active material according to an embodiment of the present disclosure has an outer portion arranged in a radial alignment structure and an inner portion with an irregular porous structure, wherein the pore size of the inner portion is larger than that of outer portion.

As described above, when the pore size of the inner portion of the nickel-based active material secondary particles is larger than the pore size of the outer portion, compared to when the pore size of the inner portion of the nickel-based active material secondary particles is equal to or smaller than the pore size of the outer portion, the distance required for diffusion of lithium ions from the surface to the inner portion is reduced. In addition, the radial alignment structure of the outer portion of the nickel-based active material facilitates the intercalation of lithium ions.

When a secondary particle has an outer portion with a radial alignment structure and an inner portion with an irregular porous structure, the primary particles constituting the secondary particle may retain a particle size that is sufficiently small enough to improve the characteristics of the nickel-based active material. The size (e.g., average particle size) of the secondary particle of the nickel-based active material may be about 2 μm to about 18 μm, about 3 μm to about 12 μm, about 8 μm to about 10 μm, or for example, about 9 μm. When the secondary particle is spherical, the term "particle size" refers to an average diameter. When the secondary particle is elliptical, rod-like, etc., the term "particle size" refers to the length of the longer (longest) axis.

In some embodiments, the secondary particle may have an outer portion with a radial alignment structure and an inner portion with a radial alignment structure. The inner portion may have a pore size of about 150 nm to about 1 μm, for example, about 150 nm to about 550 nm, and the outer portion may have a pore size of less than about 150 nm, for example, equal to or less than about 100 nm, for example, about 20 nm to about 90 nm.

The inner portion of the nickel-based active material may include a closed pore, whereas the outer portion of the nickel-based active material may include a closed pore and/or an open pore. The term "closed pore" as used herein refers to an independently formed pore in which all the walls of the pore are closed so as to provide no connection to other pores, while the term "open pore" refers to a pore having an opening in at least a part of the pore walls, thereby providing a continuous connection to the outside of the particle. A closed pore may not contain electrolyte therein, whereas an open pore may contain an electrolyte therein.

The term "pore size" used herein refers to an average diameter of a pore in the case where the pore is spherical or circular. When the pore is elliptical or the like (e.g., it has a non-spherical or circular shape), the pore size refers to the length of a longer (longest) axis (e.g., the longest aperture length of the pore). The pore size may be measured by a BET method.

The nickel-based active material may include a plate particle of which a longer axis is radially arranged (e.g., a plate particle that is positioned so that the longest axis of the particle points in a radial direction). Here, a plane of the plate particle to which lithium may be accessible (e.g., a plane perpendicular to a (001) plane) (e.g., the (100) or (010) planes) may be exposed at a surface of the secondary particle of the nickel-based active material.

The term "plate particle" and "plate-type particle" as used herein refer to a particle shape, including a particle having a thickness that is smaller than a length of a longer axis (in a plane direction). Here, the term "length of the longer axis" refers to a maximum length of the widest plane (e.g., longest planar dimension) of the plate particle.

The term "plate particle" may refer to a particle structure in which a length t in one axial direction (i.e., a thickness direction) is shorter than a length of a longer axis a in a direction perpendicular to the one axial direction (i.e., a plane direction).

FIGS. 1A(A) to 1A(C) are schematic views illustrating three example plate particle shapes according to embodiments of the present disclosure.

Referring to FIGS. 1A(A) to 1A(C), the plate particle may have a polygonal nanoplate shape similar to that of a hexagon (FIG. 1A(A)), a nanodisc (e.g., cylindrical) shape (FIG. 1A(B)), or a rectangular parallelepiped shape (FIG. 1A(C)).

In FIG. 1A(A)-1A(C), a thickness t of the plate particle is smaller than a length a and/or b in a direction along the plane on the plate particle. Here, the length a in a direction along the plane may be longer than or equal to the length b in a direction along the plane. In FIG. 1A, the direction labeled with the thickness t is defined as a thickness direction, and the directions labeled with the length a and/or b are defined as directions along the plane ("plane directions").

Figure 1B:
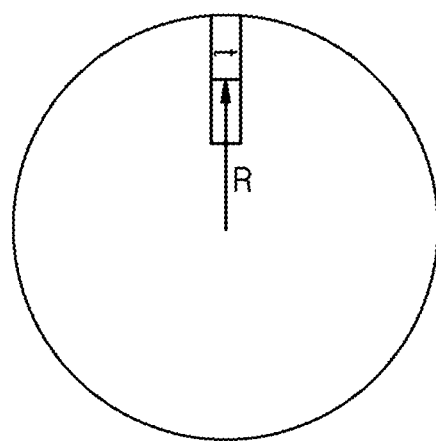
FIG. 1B is a diagram explaining the terms "radial arranged" and "radial-type", and "radial alignment" as used to describe a secondary particle of a nickel-based active material according to an embodiment of the present disclosure.

The term "radial", "radial structure", "radial-type", "radially arranged", and "radial alignment" as used herein refer to an arrangement shown in FIG. 1B, in which a plate particle is positioned so that a thickness direction t of the plate particle is perpendicular to a direction (vector) R radiating from the center of the secondary particle.

In some embodiments, the inner portion of the secondary particle of the nickel-based active material may have an irregular porous structure. The term "irregular porous structure" as used herein refers to a structure in which pores are not substantially consistent in size and/or shape and have no or substantially no uniformity. The inner portion of the nickel-based active material having such an irregular porous structure may also include the plate particle in the same or substantially the same manner as in the outer portion of the nickel-based active material. However, unlike the plate particles in the outer portion of the nickel-based active material, the plate particles included in the inner portion of the nickel-based active material may be aligned irregularly (e.g., may not be aligned). The term "outer portion" as used herein refers to an area corresponding to 30% to 50% (for example, 35% to 45%, or in some embodiments 40%) of a length extending from an outer surface toward the center of the particle, with respect to the total radial distance between the center and a surface of the secondary particle of the nickel-based active material, or the area within 2 μm of the outmost periphery of the nickel-based active material. The term "inner portion" as used herein refers to an area occupying 50% to 70% (for example, 55% to 65%, or in some embodiments 60%) of a length extending from the center toward the outer surface of the secondary particle with respect to a total radial distance between the center and a surface of the secondary particle of the nickel-based active material, or the area outside the area within 2 μm of the outermost periphery of the secondary particle of the nickel-based active material.

In some embodiments, the secondary particle has an open pore having a size (e.g., diameter) of less than about 150 nm, (for example, a size of about 10 nm to about 148 nm or about 25 nm to about 148 nm) toward the inner portion (e.g., open toward the center of the inner portion of the secondary particle. Here, the term "open pore" refers to an exposed pore through which an electrolyte may flow. In some embodiments, the open pore may be formed to an average depth of about 150 nm or less, for example, an average depth about 0.001 nm to about 100 nm or about 1 nm to about 50 nm) from the surface of the secondary particle of the nickel-based active material.

In some embodiments, the nickel-based active material may include the plate particle having a long axis arranged in a radial direction (e.g., positioned so that the longest axis of the particle points in a radial direction).

In some embodiments, an average length of the plate particles forming the outer portion and the inner portion of the secondary particle of the nickel-based active material may be about 150 nm to about 500 nm, for example, about 200 nm to about 380 nm and about 290 nm to about 360 nm. Here, the term "average length of the plate particles" refers to an average length in the plane direction of the plate particle (e.g., the average of the long and short axes of the plate particles).

In some embodiments, an average thickness of the plate particle forming the outer portion and the inner portion of the secondary particle of the nickel-based active material may be about 100 nm to about 200 nm, for example, about 120 nm to about 180 nm, or about 130 nm to about 150 nm. Here, a ratio of the average thickness to the average length of the plate particle may be about 1:2 to about 1:5, about 1:2 to about 1:10, for example, about 1:2.1 to about 1:5, or about 1:2.3 to about 1:2.9. The average length, the average thickness, and the ratio of the average thickness to the average length of the plate particles may be determined using SEM.

When the average length, the average thickness, and the ratio of the average thickness to the average length of the plate particles are within the above-mentioned ratios, the size of the plate particles is small, and the primary particles are radially arranged in the outer portion of the secondary particle of the nickel-based active material, a relatively large number of lithium diffusion paths and a relatively large number of the crystal planes capable of transferring lithium to the outside (e.g., outer portion) may be exposed on the surface of the nickel-based active material, thereby enhancing the rate of lithium diffusion such that high initial efficiency and capacity may be achieved in a lithium secondary battery including the nickel-based active material. In addition, when the plate-type primary particles are radially aligned, surface pores formed between the plate-type primary particles may be directed toward the center, thereby promoting lithium diffusion between the surface and center of the secondary particles. The radial arrangement of the plate-type particles may enable or support uniform shrinkage and expansion during intercalation and deintercalation of lithium. The presence of pores provides buffering against particle expansion in the [001] direction during intercalation. For example, pores positioned parallel to the (001) planes may provide a buffering action against particle expansion during intercalation of lithium between those planes. When the plate-type primary particles are small in size, crack formation during shrinkage and/or expansion may be reduced. Furthermore, the pores in the inner portion may additionally mitigate volumetric changes in the material. As a result, crack formation between primary particles during charging and discharging may be reduced, thereby resulting in a longer lifespan and a smaller amount of resistance increase in the lifespan of the lithium secondary battery.

In some embodiments, regarding the nickel-based active material, a pore size (e.g., diameter) in the inner portion of the nickel-based active material may be about 150 nm to about 550 nm, and a pore size in the outer portion of the nickel-based active material may be less than about 150 nm. When the pore size of the inner portion is larger than the pore size of the outer portion, the lithium diffusion distance may be shorter than when the pore size of the inner portion is the same as the pore size of the outer portion, and the pores may alleviate volume changes that may occur during charging and discharging while not exposed to an electrolyte.

The inner portion of the nickel-based active material may include a closed pore, whereas the outer portion of the nickel-based active material may include a closed pore and/or an open pore. The term "closed pore" as used herein refers to an independently formed pore in which all the walls of the pore are closed so as to provide no connection to other pores, while the term "open pore" refers to a pore having an opening in at least a part of the pore walls, thereby providing a continuous connection to the outside of the particle. A closed pore may not contain electrolyte therein, whereas an open pore may contain an electrolyte therein.

The nickel-based active material according to an embodiment of the present disclosure may minimize or reduce direct contact between the regions where cracks occur and an electrolyte even when cracks occur, such that an increase in surface resistance may be suppressed or reduced.

In some embodiments, the nickel-based active material may be an active material represented by Formula 1.

$$Li_a(Ni_{1-x-y-z}Co_xMn_yM_z)O_2 \qquad \text{Formula 1}$$

In Formula 1, M may be at least one element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), and a, x, y, and z may satisfy the following relations: $0.95 \leq a \leq 1.3$, $x \leq (1-x-y-z)$, $y \leq (1-x-y-z)$, $0 < x < 1$, $0 \leq y < 1$, $0 \leq z < 1$. As such, in the nickel-based active material of Formula 1, an amount of nickel (Ni) is greater than that of cobalt (Co), and an amount of nickel (Ni) is greater than that of manganese (Mn).

In Formula 1, a, x, y, and z may satisfy the following relations: $0.95 \leq a \leq 1.3$, for example, $1.0 \leq a \leq 1.1$, $0 < x \leq 0.33$, for example, $0.1 \leq a \leq 0.33$, $0 \leq y \leq 0.5$, for example, $0.05 \leq y \leq 0.3$, $0 \leq z \leq 0.05$, and $0.33 \leq (1-x-y-z) \leq 0.95$. For example, in Formula 1, $0.33 \leq (1-x-y-z) \leq 0.95$.

In some embodiments, in Formula 1, a, x, y, and z satisfy the following relations: $0.95 \leq a \leq 1.3$, $0 \leq z \leq 0.05$, $0 < x \leq 0.33$, and $0 \leq y \leq 0.33$.

In some embodiments, in Formula 1, z may be 0.

In some embodiments, in Formula 1, M may be Al in the case of $0 < z \leq 0.05$.

The amount of Ni in the nickel-based active material may be about 0.33 mol % to about 0.95 mol % based on the total amount of transition metals including Ni, Co, and Mn, and may be higher than that of Mn. The amount of Ni in the nickel-based active material may be higher than that of Co.

The amount of Ni in the nickel-based active material may be greater than that of other transition metals, based on 1 mole of total transition metals. When a nickel-based active material having a large nickel content is used as described above for a positive electrode to be included in a lithium secondary battery, the lithium diffusion rate may be high, the conductivity may be good, and a higher capacity may be obtained at the same voltage. However, the lifespan characteristics of the battery may deteriorate due to crack formation.

An aspect of example embodiments of the present disclosure provides a nickel-based active material having improved lifespan characteristics.

The amount of Ni in the nickel-based active material may be about 0.33 mol % to about 0.95 mol % based on the total amount of transition metals including Ni, Co, and Mn, and may be greater than that of Mn and Co.

The hetero-element compound between the primary particles in the nickel-based active material according to an embodiment of the present disclosure may include at least one selected from zirconium (Zr), titanium (Ti), aluminum (Al), magnesium (Mg), tungsten (W), phosphorus (P), and boron (B), for example, at least one selected from zirconium (Zr), titanium (Ti), aluminum (Al), magnesium (Mg), tungsten (W), phosphorus (P), and boron (B). The hetero-element compound may simultaneously include lithium (Li) and a hetero-element compound. The hetero-element compound may be, for example, i) an oxide of at least one selected from zirconium (Zr), titanium (Ti), aluminum (Al), magnesium (Mg), tungsten (W), phosphorus (P), and boron (B); or an oxide containing lithium and at least one selected from zirconium (Zr), titanium (Ti), aluminum (Al), magnesium (Mg), tungsten (W), phosphorus (P), and boron (B).

The hetero-element compound may be, for example, $ZrO_2$, $Al_2O_3$, $LiAlO_2$, $Li_2TiO_3$, $Li_2ZrO_3$, $LiBO_3$, $Li_3PO_4$, or the like.

The nickel-based active material may be $LiNi_{0.6}Co_{0.2}Mn_{0.2}O_2$, $LiNi_{0.5}Co_{0.2}Mn_{0.3}O_2$, $LiNi_{0.33}Co_{0.33}Mn_{0.33}O_2$, $LiNi_{0.8}Co_{0.1}Mn_{0.1}O_2$, or $LiNi_{0.85}Co_{0.1}Al_{0.05}O_2$.

The nickel-based active material may have an overall porosity of about 1% to about 8%, for example, about 1.5% to about 7.3% (e.g., of the total volume of solids and voids). In the nickel-based active material, the porosity of the outer portion of the nickel-based active material may be smaller than that of the inner portion of the nickel-based active material. The nickel-based active material may have pores exposed to the surface that face the center of the inner portion of the particle. When viewed from the surface of the nickel-based active material, the pores may have a size of less than about 150 nm, about 10 nm to about 100 nm, or for example, about 50 nm to about 100 nm. The porosity of the inner portion of the secondary particle of the nickel-based active material may be about 2% to about 20%, and the closed porosity in the outer portion of the secondary particle of the nickel-based active material may be about 0.1% to about 2%. The term "closed porosity" as used herein refers to a fraction of closed pores (pores through which an electrolyte cannot penetrate) relative to a volume of total pores.

In the present specification, the terms "porosity" and "porosity fraction are interchangeably used to refer to the ratio of an area (e.g., volume) occupied by pores to a total area (e.g., volume) of the pores and solid material of the nickel-based active material.

In some embodiments, the porosity (porosity fraction) in the inner portion of the nickel-based active material may be about 3.3% to about 16.5%, and the porosity (porosity fraction) in the outer portion of the nickel-based active material may be about 0.3% to about 0.7%.

The nickel-based active material according to an embodiment of the present disclosure is a positive active material having a high lithium diffusion constant, thereby enabling a high initial charge/discharge efficiency and a high capacity in a rechargeable lithium battery. The nickel-based active material suppresses crack formation during charge/discharge cycling to reduce resistance increases and prolong the lifespan of the battery. In addition, in the nickel-based active material according to an embodiment of the present disclosure, the hetero-element compound is located between primary particles. Accordingly, even when cracks occur, direct exposure of the cracked surfaces to the electrolyte may be minimized or reduced. A lithium secondary battery in which cell performance is improved due to the inclusion of such a nickel-based active material in the positive electrode is provided.

Figure 1C:
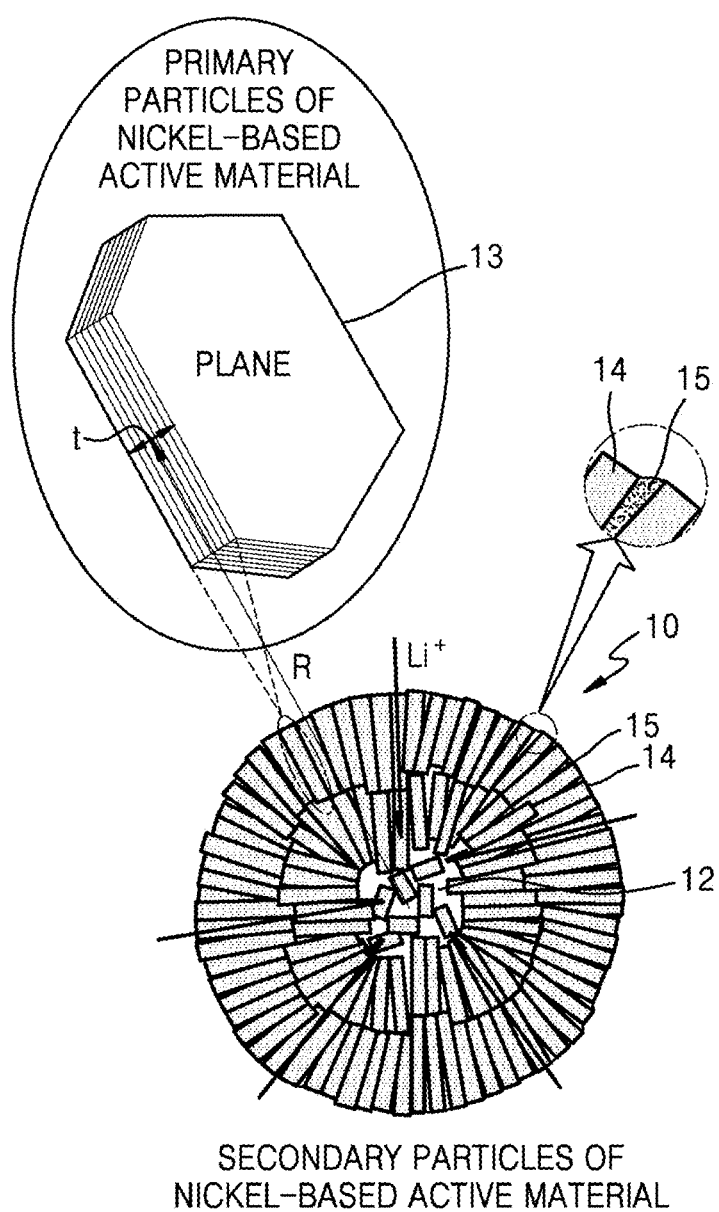
FIG. 1C is a cross-sectional schematic view of a secondary particle of a nickel-based active material for a lithium secondary battery according to an embodiment of the present disclosure, including an inset showing a perspective view of a single plate-shaped primary particle.

FIG. 1C is a cross-sectional view of the nickel-based active material 10 according to an embodiment of the present disclosure.

Referring to FIG. 1C, a secondary particle of the nickel-based active material 10 includes an outer portion 14 in which plate particles 13 are arranged in a radial direction and an inner portion 12 in which plate particles 13 are irregularly arranged. The hetero-element compound 15 may be present between plate particles and on surfaces of the plate particles. The inner portion 12 of the secondary particle of the nickel-based active material 10 includes more spaces between the plate particles 13 compared to the outer portion 14 of the nickel-based active material 10. The inset of FIG. 1C shows a perspective view of one of the plate-shaped primary particles that aggregate to form the secondary particle of the nickel-based active material. In some embodiments, the size and porosity of a pore in the inner portion 12 of the nickel-based active material 10 are larger and more irregular compared to those in the outer portion 14 of the nickel-based active material 10. In FIG. 1C, the single-headed arrows indicate the movement of $Li^+$ ions.

In some embodiments, when the nickel-based active material includes a hetero-element compound between primary particles, the influence (effects) of interfacial exposure when cracks occur may be minimized or reduced, and the hetero-element compound provides a contact effect between particles. In some embodiments, surface of the primary particles may be coated with the hetero-element compound to minimize or reduce deterioration of the surface. Therefore, such a nickel-based active material may enable production of a lithium secondary battery having improved lifespan characteristics.

In some embodiments, the nickel-based active material may include radial (e.g., radially aligned) plate particles and non-radial (e.g., unaligned) plate particles. The amount of the non-radial plate particles may be 20 parts by weight or less, for example, about 0.01 parts by weight to about 10 parts by weight, or about 0.1 parts by weight to about 5 parts by weight, based on 100 parts by weight of the total weight of the radial plate particles and the non-radiation plate particles. When the non-radial plate particles are included in the above-described amount range in addition to the radial plate particles in the nickel-based active material, lithium may be easily diffused so that lithium secondary batteries having improved lifespan characteristics may be manufactured.

The size (average particle size) of the secondary particles of the nickel-based active material may be about 2 μm to about 18 μm, for example, about 3 μm to about 12 μm, for example, about 8 μm to about 10 μm, or about 9 μm. When the secondary particle is spherical, the particle size indicates an average diameter. When the secondary particle is elliptical, rod-like, etc., the particle size indicates the length of the longest axis.

Figure 1D:
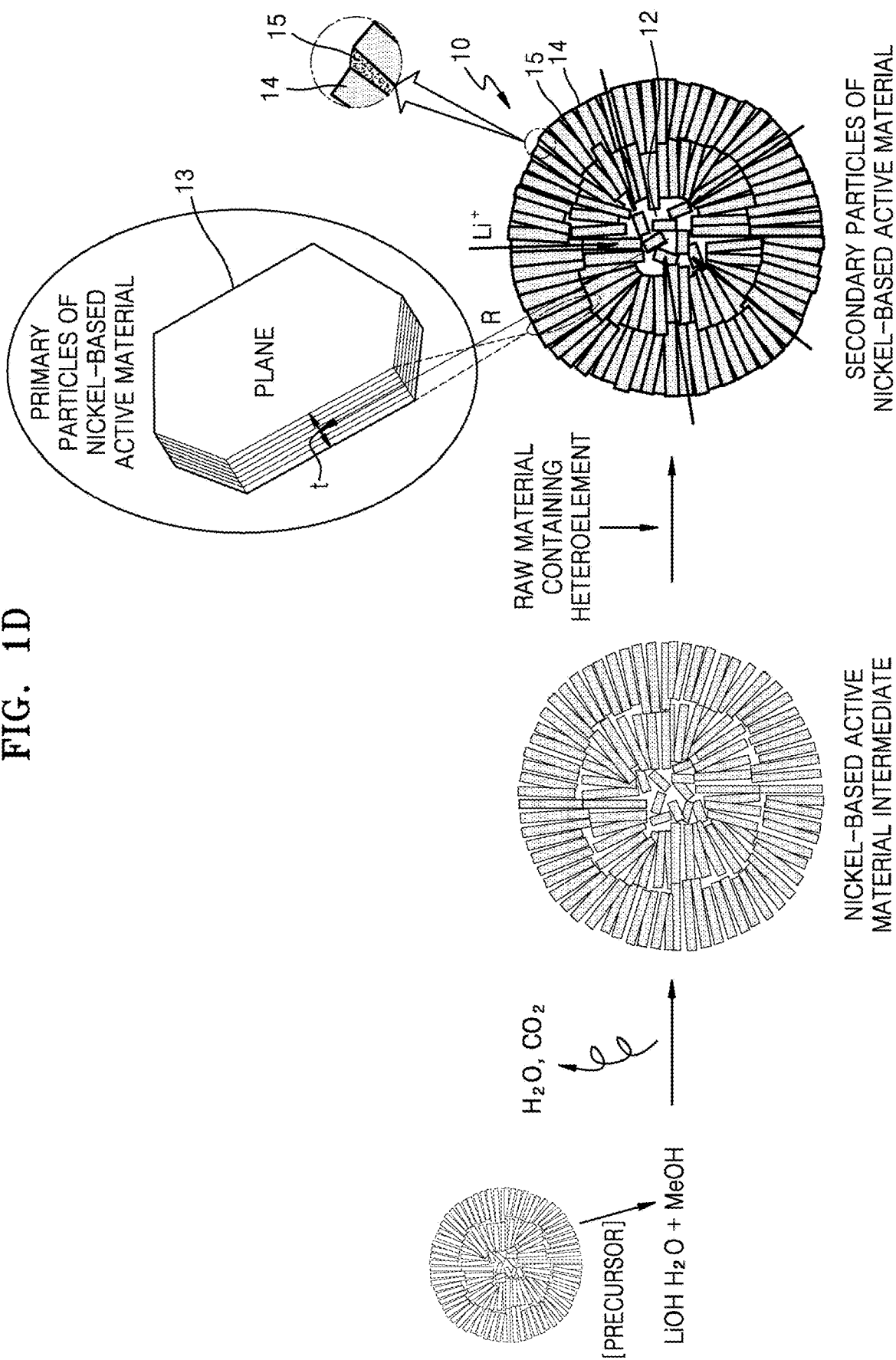
FIG. 1D is a diagram showing a process of preparing a nickel-based active material according to an embodiment of the present disclosure.

A method of preparing the nickel-based active material according to an embodiment of the present disclosure will be described with reference to FIG. 1D. FIG. 1D illustrates a method of manufacturing a nickel-based active material having a structure in which a hetero-element compound is included between primary particles in the secondary particle of the nickel-based active material As described above, the nickel-based active material according to some embodiments includes radial plate particles to help diffuse lithium, and to suppress or reduce crack formation and/or stress due to volume changes during lithium intercalation and deintercalation. In some embodiments, the influence (effects) of interfacial exposure during cracking may be reduced through the coating of hetero-element compounds between primary particles. In addition, formation of a surface resistance layer during manufacturing may be reduced, and a greater number of the lithium diffusion paths to the surface increases the active surface area available for lithium diffusion. In some embodiments, in the nickel-based active material, the outer portion may have plate particles having a long radial shape in the longer axis direction, and the inner portion may have short, flat plate particles having a length of about 150 nm to about 200 nm, for example, nanodisc-shaped particles.

The nickel-based active material 10 including the primary particles coated as described above may be prepared in an oxidizing gas atmosphere while exhaust is suppressed by mixing a nickel-based active material intermediate (nickel-based active material secondary particle) with a raw material including at least one selected from zirconium (Zr), titanium (Ti), aluminum (Al), magnesium (Mg), tungsten (W), phosphorous (P), and boron (B), and subjecting the mixture to a second heat treatment (high-temperature heat treatment).

When the exhaust is suppressed during the production of secondary particles of the nickel-based active material, the atmosphere inside the reactor may be maintained as much as possible, and formation of a resistant layer may be suppressed or reduced and particle densification may be achieved.

The high-temperature heat treatment may be performed at a temperature of about 700° C. to about 900° C. Here, the temperature increment rate (e.g., ramp) during the high-temperature heat treatment may be about 1° C./minute to about 5° C./minute, for example, about 3° C./minute. The time for the high-temperature heat treatment may vary according to the temperature at which the high-temperature heat treatment is performed. For example, if the heat treatment is performed at 900° C., the heat treatment time may be about 3 hours. As another example, if the heat treatment is performed at 700° C., the heat treatment time may be about 10 hours.

Accordingly, an average particle diameter of the secondary particle of the nickel-based active material may be about 2 μm to about 18 μm, for example, about 3 μm to about 12 μm, about 8 μm to about 10 μm, or about 9 μm. As used herein, the term "average particle diameter" may refer to D50 of the particles. D50 may be measured using a particle size analyzer(USA).

Non-limiting examples of the raw material including at least one selected from zirconium (Zr), titanium (Ti), aluminum (Al), magnesium (Mg), tungsten (W), phosphorous (P), and boron (B) may include titanium oxide, zirconium oxide, aluminum oxide, magnesium oxide, tungsten chloride, and ammonium phosphate.

An amount of the hetero-element included in the hetero-element compound is controlled to be about 0.0005 mol to about 0.03 mol based on a total mole ratio (1 mol) of the transition metals of the nickel-based active material.

When the raw material including at least one selected from zirconium, titanium, aluminum, magnesium, tungsten, phosphorus, and boron is mixed with secondary particles of the nickel-based active material and subjected to a heat treatment process, secondary particles of the nickel-based active material coated with a compound of at least one selected from zirconium, titanium, aluminum, magnesium, tungsten, phosphorus, and boron may be obtained. The compound produced from the raw material including at least one selected from zirconium, titanium, aluminum, magnesium, tungsten, phosphorus, and boron may be present at grain boundaries of primary particles of the nickel-based active material and/or on the surface of the primary particles.

The mixing of the raw material including at least one selected from the above-described hetero-elements (zirconium, titanium, aluminum, magnesium, tungsten, phosphorus, and boron) with the nickel-based active material intermediate may be carried out utilizing a dry or wet process.

The dry process may include, for example, mixing the raw material including at least one selected from the above-described hetero-elements with the nickel-based active material intermediate in a mixer.

In some embodiments, the dry mixing may be performed by milling. The milling may be carried out under mild conditions so that the raw material and the secondary particles of the nickel-based active material, used as starting materials, are not deformed or pulverized. When the raw material is milled with the intermediate secondary particles of the nickel-based active material that has been subjected to the first heat treatment about at 300 rpm to about 3,000 rpm, the desired nickel-based active material may be obtained.

When a temperature inside the mixer rises to about 30° C. or higher during the milling process described above, a cooling process may be performed to maintain the temperature inside the mixer within the room temperature (25° C.) range.

The wet process may be performed in such a manner that the raw material containing at least one selected from above-described hetero-elements (zirconium, titanium, aluminum, magnesium, tungsten, phosphorus, and boron) and the nickel-based active material intermediate are mixed with a solvent, and the resulting slurry is stirred.

Non-limiting examples of the solvent may include water, ethanol, and/or the like. As described above, since the hetero-element compound is coated on the grain-boundaries of the primary particles constituting the secondary particle of the nickel-based active material, even when cracks occur, exposure of the uncoated surface of the nickel-based active material (e.g., to electrolyte) is minimized.

The presence and distribution of the hetero-element compound may be confirmed by electron probe micro-analysis (EPMA) and/or secondary ion mass spectroscopy (Nano-SIMS).

When the active material is discharged, the lithium diffusion rate (constant) decreases at the end of discharge. When the size of the secondary particles of the nickel-based active material is large, lithium may face increased resistance to lithium insertion into the particles, and resulting in a lowered charge/discharge efficiency.

However, in the nickel-based active material secondary particles according to an embodiment of the present disclosure, the porous structure of the inner portion reduces the diffusion distance to the inner portion of the particle, and the radial alignment of the outer portion facilitates intercalation of lithium into the particle surface. Further, since the size of the primary particles of the nickel-based active material is small, it is easy to secure the lithium transfer path between the crystal grains. Also, since the size of the primary particles is small and the pores between the primary particles reduce or buffer volumetric changes occurring during charging and discharging, the stress associated with such volume changes is minimized.

As shown in FIG. 1D, the above-mentioned nickel-based active material intermediate may be prepared by mixing a lithium precursor and a metal hydroxide at a predetermined molar ratio and performing the first heat treatment (low temperature heat treatment) on the mixture at 600° C. to 800° C. In FIG. 1D, LiOH.H$_2$O is used as an example lithium precursor, and Me(OH)$_2$ is used as the metal hydroxide, where Me includes nickel, cobalt, manganese, and M of formula (1).

The metallic hydroxide may be a compound represented by Formula 2.

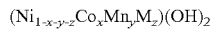

(Ni$_{1-x-y-z}$Co$_x$Mn$_y$M$_z$)(OH)$_2$     Formula 2

In Formula 2, M may be at least one element selected from B, Mg, Ca, Sr, Ba, Ti, V, Cr, Fe, Cu, Zr, and Al, and x, y, and z satisfy the following relations: x≤(1−x−y−z), y≤(1−x−y−z), 0<x<1, 0≤y<1, and 0≤z<1.

In Formula 2, x, y, and z satisfy 0<x≤0.33, 0≤y≤0.5, 0≤z≤0.05, and 0.33≤(1−x−y−z)≤0.95.

In Formula 2, x, y, and z satisfy 0.5≤(1−x−y−z)≤0.95.

In Formula 2, the metallic hydroxide may be, for example, Ni$_{0.6}$Co$_{0.2}$Mn$_{0.2}$(OH)$_2$, Ni$_{0.5}$Co$_{0.2}$Mn$_{0.3}$(OH)$_2$, Ni$_{0.33}$Co$_{0.33}$Mn$_{0.33}$(OH)$_2$, Ni$_{0.8}$Co$_{0.1}$Mn$_{0.1}$(OH)$_2$ or Ni$_{0.85}$Co$_{0.1}$Al$_{0.05}$(OH)$_2$.

The lithium precursor may be, for example, lithium hydroxide, lithium fluoride, lithium carbonate, or a mixture thereof. The ratio of the lithium precursor to the metallic hydroxide may be stoichiometrically adjusted to prepare the metallic hydroxide of Formula 2.

Here, the mixing may be dry mixing, or may be performed using a mixer or the like.

The dry mixing may be performed by milling. The milling conditions may be selected so that the metallic hydroxide starting material barely undergoes deformation such as micronization. In this regard, the size of the lithium precursor to be mixed with the metallic hydroxide may be controlled. In some embodiments, the size (average particle diameter) of the lithium precursor may be about 5 μm to about 20 μm, for example, about 10 μm. When the lithium precursor having the size within this range is subjected to a milling process with the metallic hydroxide at a rate of about 300 rpm to about 3,000 rpm, a desired nickel-based active material intermediate may be obtained.

When a temperature inside the mixer rises to about 30° C. or higher during the milling process described above, a cooling process may be performed to maintain the temperature inside the mixer within the room temperature (25° C.) range.

The size of the metallic hydroxide may be almost or substantially identical to that of the nickel-based active material. In some embodiments, the metallic hydroxide may have, for example, an average thickness of about 100 nm to about 250 nm, an average length of about 250 nm to about 1,100 nm. In addition, the pore size of the inner portion may be about 150 nm to about 1 μm, for example, about 150 nm to about 550 nm, and the pore size of the outer portion may be about 50 nm to about 148 nm.

The low-temperature heat treatment may be performed in an oxidative gas atmosphere. In the oxidative gas atmosphere, an oxidative gas, such as oxygen or air, may be used. For example, the oxidative gas may include oxygen or air at about 10 volume % to about 20 volume %, and inert gas at about 80 volume % to about 90 volume %.

The low-temperature heat treatment may be appropriately or suitably performed at the densification temperature or lower as the reaction of the lithium precursor and the metallic hydroxide proceeds. Here, the term "densification temperature" refers to the temperature at which crystallization occurs to a sufficient degree so as to promote an increase in charging capacity of the active material.

The low-temperature heat treatment may be performed, for example, at a temperature of about 600° C. to about 800° C., or about 650° C. to about 800° C. Here, the rate of temperature rise during the low-temperature heat treatment may be about 1° C./minute to about 5° C./minute, and for example, may be about 3° C./minute.

The low-temperature heat treatment may be performed for about 3 hours to about 10 hours. The time for the low-temperature heat treatment may be selected according to the temperature at which the low-temperature heat treatment is performed. For example, if the low temperature heat treatment is performed at 800° C., the heat treatment time may be about 3 hours. As another example, if the low temperature heat treatment is performed at 650° C., the heat treatment time may be about 10 hours.

When the heat treatment is performed under the above-described conditions, secondary particles of the nickel-based active material having the outer portion with a radial arrangement structure and the inner portion with an irregular porous structure may be produced. Here, an average particle diameter of plate-type primary particles constituting the secondary particles of the nickel-based active material may be about 100 nm to about 250 nm in a shorter axis direction.

When the average particle diameter is within this range, the stress caused by changes in volume during charge/discharge cycling may be suppressed.

When the nickel-based positive active material according to embodiments of the present disclosure is cut into cross-sections, a volumetric ratio of an inner portion to an outer portion of a cross section may be examined. The area (e.g., portion of the particle) located within about 60% from the center may be defined as the inner portion, and the inner portion may contain about 20 volume % to about 35 volume % (for example, about 22%) of the total volume of the nickel-based active positive material. When defining an inner portion and an outer portion, the inner portion and the outer portion may be distinguished by an area ratio instead of a volume.

In some embodiments, a c-plane (e.g., 001 plane) of the primary particle of the nickel-based active material may be arranged in a radial direction.

The nickel-based active material according to an embodiment of the present disclosure is a positive active material having a high initial charge/discharge efficiency and a high capacity due to the increased the lithium diffusion rate during charging and discharging.

A method of preparing a metallic hydroxide that is porous and has a plate particle shape according to an embodiment of the present disclosure will be described. The method of preparing the metallic hydroxide is not particularly limited, and for example, may be performed according to a co-precipitation method or a solid phase method. Hereinafter, as an example, the metal hydroxide compound of Formula 2 is prepared using a co-precipitation method.

A raw material for the nickel-based active material, such as a Ni precursor, a Co precursor, a Mn precursor, and a metal M precursor, is mixed with a solvent to obtain a precursor mixture.

The amounts of the Ni precursor, the Co precursor, the Mn precursor, and the metal M precursor may be stoichiometrically adjusted to prepare the compound of Formula 2.

The solvent may include water, ethanol, propanol, and/or butanol.

A precipitator and a pH regulator may be added to the precursor mixture to control the pH of the resulting mixture. A co-precipitation method is performed on the resulting mixture to obtain a precipitate product. Here, the pH of the pH of the mixture is adjusted to pH 10 to pH 13.

The precipitates obtained therefrom are subjected to filtration and heat treatment. The heat treatment may be performed at a temperature of about 20° C. to about 160° C. to dry the filtrates.

The precipitator may control or regulate one or more precipitation reaction rates associated with the co-precipitation reaction. Non-limiting examples thereof may include sodium hydroxide (NaOH), ammonium hydroxide ($NH_4OH$), and citric acid. The amount of the precipitator may be similar to that suitably used in the related art.

The pH regulator may control or regulate the pH of a reaction mixture. Non-limiting examples thereof may include ammonium hydroxide, sodium hydroxide (NaOH), sodium carbonate ($Na_2CO_3$), and sodium oxalate ($Na_2C_2O_4$).

Non-limiting examples of the Ni precursor may include nickel sulfate, nickel chloride, and nickel nitrate. Non-limiting examples of the Co precursor may include cobalt sulfate, cobalt chloride, and cobalt nitrate. Non-limiting examples of the Mn precursor may include manganese sulfate, manganese nitrate, and manganese chloride. Non-limiting examples of the metal M precursor may include metal carbonate, metal sulfate, metal nitrate, and metal chloride.

Hereinafter, a method of preparing a lithium secondary battery including a positive electrode including the nickel-based active material according to an embodiment of the present disclosure, a negative electrode, a non-aqueous electrolyte containing a lithium salt, and a separator will be described.

A positive electrode and a negative electrode may be prepared by applying and drying a composition for forming a positive active material layer on a first current collector, and applying and drying a composition for forming a negative active material layer on a second current collector.

The composition for forming the positive active material layer may be prepared by mixing a positive active material, a conductive agent, a binder, and a solvent. In some embodiments, a lithium composite oxide represented by Formula 2 may be used as the positive active material.

The binder (which is a component that assists in binding a current collector), an may be added to an active material, a conductive agent, and/or the like in an amount about 1 part to about 50 parts by weight based on 100 parts by weight of the total weight of the positive active material. Non-limiting examples of the binder may include polyvinylidene fluoride (PVDF), polyvinyl alcohol (PVA), carboxymethyl cellulose (CMC), starch, hydroxypropyl cellulose, regenerated cellulose, polyvinylpyrrolidone, polytetrafluoroethylene, polyethylene, polypropylene, ethylene-propylene-diene terpolymer (EPDM), sulfonated EPDM, styrene butadiene rubber (SBR), fluorine rubber, and various copolymers. Here, an amount of the binder may be about 2 part to about 5 parts by weight based on 100 parts by weight of the total weight of the positive active material layer. When the amount of the binder is within the range above, a satisfactory binding force of the positive active material layer to the current collector may be achieved.

Any conductive agent material may be used as long as it has electrical conductivity but does not cause a chemical change in a corresponding battery. Non-limiting examples of the conductive agent may include graphite (such as natural graphite or artificial graphite); a carbonaceous material (such as carbon black, acetylene black, Ketjenblack®, channel black, furnace black, lamp black, or summer black); a conductive fiber (such as carbon fiber or metal fiber); a fluorocarbon; a metallic powder (such as aluminum powder or nickel powder); a conductive whisker (such as zinc oxide or potassium titanate); and a conductive material (such as a polyphenylene derivative).

In some embodiments, an amount of the conductive agent may be about 2 parts to about 5 parts by weight based on 100 parts by weight of the total weight of the composition for forming the positive active material. When the amount of the conductive agent is within the above-described range, the finished electrode may have excellent or suitable conductivity.

A non-limiting example of the solvent is N-methylpyrrolidone.

In some embodiments, an amount of the solvent may be about 1 part to about 10 parts by weight based on 100 parts by weight of the total weight of the composition for forming the positive active material layer. When the amount of the solvent is within the above-described range, the positive active material layer may be easily formed.

The material used to form the positive current collector is not particularly limited as long as it has a thickness of about 3 µm to about 500 µm and has a high conductivity without causing a chemical change when incorporated in a battery. Non-limiting examples of the material used to form the positive current collector may include stainless steel, aluminum, nickel, titanium, heat treated carbon, and/or aluminum or stainless steel that is surface-treated with carbon, nickel, titanium, and/or silver. The current collector may have a fine uneven structure (e.g., microstructure) at its surface to increase a binding force between the current collector and the positive active material. The current collector may have any suitable shape (such as a film, sheet, foil, net, porous, foam, or non-woven shape).

In a separate manner, the composition for forming the negative active material layer may be prepared by mixing a negative active material, the binder, the conductive agent, and the solvent.

Any material that allows lithium ions to intercalate thereinto or deintercalate therefrom may be used as the negative active material. Non-limiting examples of the negative active material may include graphite, a carbonaceous material (such as carbon), lithium metal, an alloy of lithium metal, and a silicon oxide-based material. In some embodiments, silicon oxide may be used as the negative active material.

An amount of the binder may be about 1 part to about 50 parts by weight based on 100 parts by weight of the total weight of composition for forming the negative active material layer. Non-limiting examples of the binder may include the same as those described herein in connection with the positive electrode.

An amount of the conductive agent may be about 1 to about 5 parts by weight, based on 100 parts by weight of the total weight of the composition for forming the negative active material layer. When the amount of the conductive agent is within the range above, the finished electrode may have excellent conductivity.

An amount of the solvent may be about 1 to about 10 parts by weight, based on 100 parts by weight of the total weight of the composition for forming the negative active material layer. When the amount of the solvent is within the range above, the negative active material layer may be easily formed.

The conductive agent and the solvent may each independently be the same as those described herein in connection with the positive electrode.

The negative current collector may have a thickness of about 3 µm to about 500 µm. Any material may be used to form the negative current collector as long as it has electrical conductivity but does not cause a chemical change in a corresponding battery. Non-limiting examples of the negative current collector may include copper, stainless steel, aluminum, nickel, titanium, heat treated carbon, and/or copper or stainless steel that is surface treated with carbon, nickel, titanium, silver, and/or an aluminum-cadmium alloy. In some embodiments, the negative current collector may have a fine uneven structure (e.g., microstructure) at its surface to increase a binding force thereof with respect to a negative active material. For example, the negative current collector may have any suitable shape or form (such as film, sheet, foil, net, porous, foam, or non-woven shape).

A separator may be between the positive electrode and the negative electrode, each electrode being manufactured as described above.

The separator may have a pore diameter of about 0.01 µm to about 10 µm and a thickness of about 5 µm to about 300 µm. Non-limiting examples of materials for forming the separator include an olefin-based polymer (such as polypropylene or polyethylene) and glass fiber. In some embodiments, the separator may have a sheet or non-fabric (e.g., non-woven) form. When a solid electrolyte, such as a polymer, is used as the electrolyte, the solid electrolyte may also act as a separator.

The non-aqueous electrolyte containing a lithium salt may include a non-aqueous solvent. Non-limiting examples of the non-aqueous electrolyte may include an organic solid electrolyte and an inorganic solid electrolyte.

Non-limiting examples of the non-aqueous solvent may include an aprotic organic solvent, such as N-methyl-2-pyrrolidinone, propylene carbonate, ethylene carbonate, butylene carbonate, dimethyl carbonate, diethyl carbonate, gamma-butyrolactone, 1,2-dimethoxy ethane, 2-methyl tetrahydrofuran, dimethyl sulfoxide, 1,3-dioxolane, formamide, N,N-dimethylformamide, acetonitrile, nitromethane, methyl formate, methyl acetate, triester phosphate, trimethoxy methane, sulfolane, methyl sulfolane, 1,3-dimethyl-2-imidazolidinone, propylene carbonate, a tetrahydrofuran derivative, ether, methyl propionate, and/or ethyl propionate.

Non-limiting examples of the organic solid electrolyte may include a polyethylene derivative, a polyethylene oxide derivative, a polypropylene oxide derivative, a phosphate ester polymer, polyester sulfide, polyvinyl alcohol, and polyvinylidene fluoride.

Non-limiting examples of the inorganic solid electrolyte may include $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt may be any suitable material that is easily dissolved in the non-aqueous electrolyte. Non-limiting examples thereof may include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, and tetrakisphenyl lithium borate.

Figure 2:
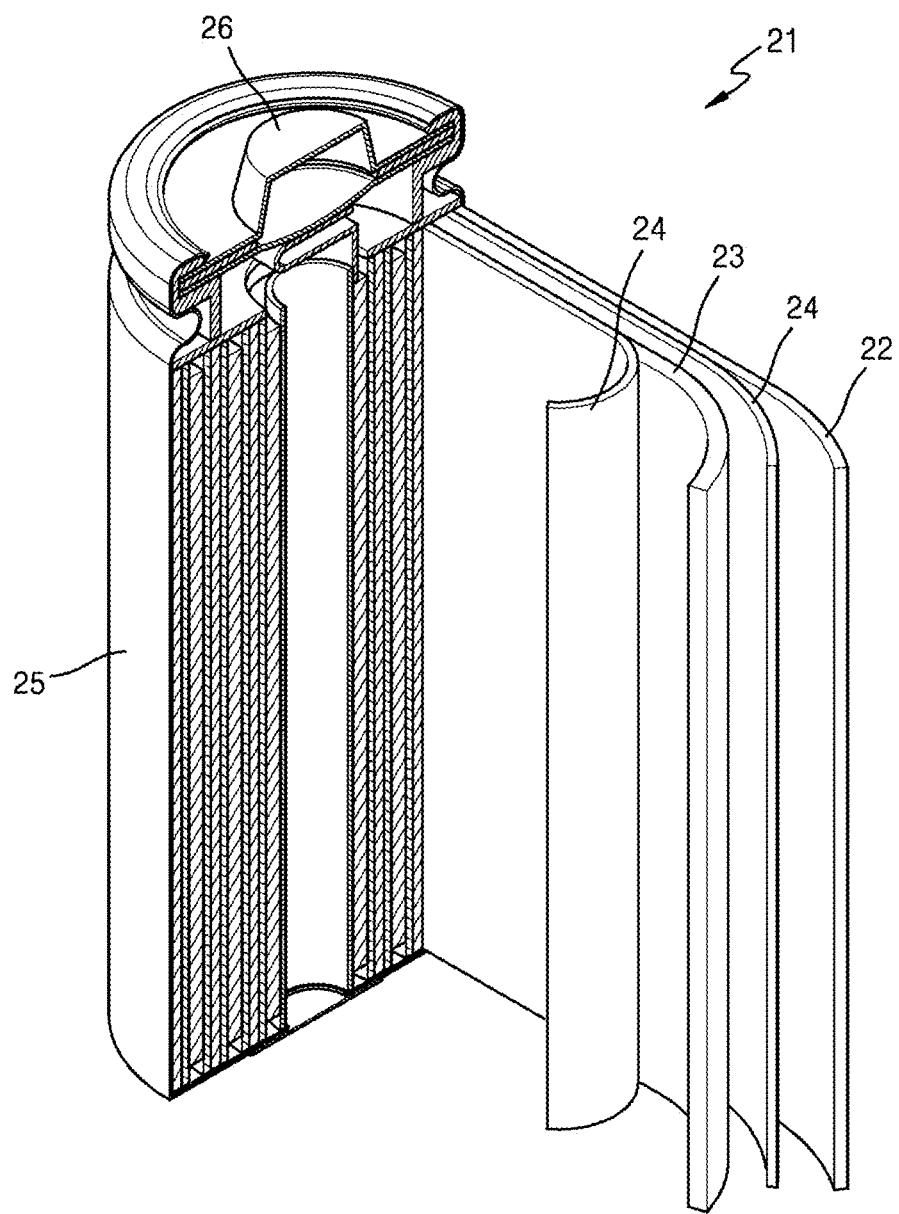
FIG. 2 is a schematic view of a lithium secondary battery including a positive electrode including a nickel-based active material according to an embodiment of the present disclosure.

FIG. 2 is a schematic view of a structure of a lithium secondary battery 21 according to an embodiment of the present disclosure.

Referring to FIG. 2, the lithium secondary battery 21 includes a positive electrode 23 containing a nickel-based active material according to an embodiment, a negative electrode 22, and a separator 24. The positive electrode 23, the negative electrode 22 and the separator 24 described above are wound or folded and sealed in the battery case 25. Then, an organic electrolyte solution is injected into the battery case 25, and the resultant structure is sealed with the cap assembly 26, thereby completing the lithium secondary battery 21. The battery case 25 may be a cylindrical type (format), a rectangular type (format), or a thin-film type (format) battery. For example, the lithium secondary battery 21 may be a large thin-film type (format) battery. For example, the lithium secondary battery 21 may be a lithium ion battery. The separator 24 may be between the positive electrode 23 and the negative electrode 22 to form a battery assembly. The battery assembly may be stacked in a bi-cell structure and impregnated with the organic electrolyte. The resultant assembly may be put into a pouch and hermetically sealed, thereby completing the manufacture of a lithium ion polymer battery. In some embodiments, the a plurality of battery assemblies may be stacked to form a battery pack, which may be used in any device that requires high capacity and high output, for example, in a laptop computer, a smart phone, or an electric vehicle.

The lithium secondary battery may have excellent storage stability at a high temperature, improved lifetime characteristics, and high rate characteristics, and thus may be used in an electric vehicle (EV), for example, in a hybrid vehicle such as a plug-in hybrid electric vehicle (PHEV).

Embodiments will be described in more detail with reference to the following examples and comparative examples. However, Examples are provided herein for illustrative purposes only and the scope of the present disclosure is not limited thereto.

Preparation Example 1: Preparation of Composite Metallic Hydroxide ($Ni_{0.6}Co_{0.2}Mn_{0.2}(OH)_2$)

A composite metallic hydroxide powder ($Ni_{0.6}Co_{0.2}Mn_{0.2}(OH)_2$), which was radially aligned, porous, and had plate particle shapes, was obtained according to the co-precipitation method described below.

Ammonia water and a raw materials for the nickel-based active material were added to the reactor. The amounts of the raw materials of the nickel-based active material were controlled or selected so as to obtain a stoichiometric composition of the desired composite metal hydroxide. The pH of the reactor mixture was adjusted using sodium hydroxide. Next, continuous stirring of the mixture within the reactor was carried out until a desired size of final product was reached, at which point addition of the mixture of the raw materials to the reactor was stopped. The resulting product was subjected to a drying process, thereby yielding a composite metal hydroxide. This process of preparing the composite metal hydroxide will be described in more detail as follows.

The raw materials for the nickel-based active material (nickel sulfate ($NiSO_4.6H_2O$), cobalt sulfate ($CoSO_4.7H_2O$), and manganese sulfate ($MnSO_4.H_2O$)) were dissolved in distilled water as a solvent at a molar ratio of 6:2:2 to prepare a mixed solution. To form a complex compound, a diluted ammonia solution ($NH_4OH$) and sodium hydroxide (NaOH were prepared for use as a precipitator.

Then, to a batch-type reactor containing diluted ammonia solution, a mixed solution of raw materials, ammonia water solution, and sodium hydroxide was continuously added to the reactor from the top of the reactor To maintain the pH inside the reactor, sodium hydroxide was added by a pH controller. The reaction was carried out with continuous stirring for about 20 hours, after which the introduction of the raw materials was stopped.

The resulting slurry solution in the reactor was filtered and washed with high-purity distilled water, and then, dried in a hot air oven for 24 hours, thereby yielding the composite metallic hydroxide ($Ni_{0.6}Co_{0.2}Mn_{0.2}(OH)_2$), which was radially aligned, porous, and had a plate particle shape.

Preparation Example 2: Preparation of Composite Metallic Hydroxide ($Ni_{0.5}Co_{0.2}Mn_{0.3}(OH)_2$)

Composite metal hydroxide ($Ni_{0.5}Co_{0.2}Mn_{0.3}(OH)_2$) was obtained in the same manner as in Preparation Example 1, except that the amounts of nickel sulfate, cobalt sulfate, and manganese sulfate were changed to a molar ratio of 5:2:3 and the reaction was carried out for 25 hours.

Preparation Example 3: Preparation of Composite Metal Hydroxide ($Ni_{0.8}Co_{0.1}Mn_{0.1}(OH)_2$)

Composite metal hydroxide ($LiNi_{0.8}Co_{0.1}Mn_{0.1}(OH)_2$) was obtained in the same manner as in Preparation Example 1, except that the amounts of nickel sulfate, cobalt sulfate, and manganese sulfate were changed to a molar ratio of 8:1:1 and the reaction was carried out for 25 hours.

Preparation Example 4: Preparation of Composite Metal Hydroxide ($Ni_{0.85}Co_{0.1}Al_{0.05}(OH)_2$)

Composite metal hydroxide ($Ni_{0.85}Co_{0.1}Al_{0.05}(OH)_2$) was obtained in the same manner as in Preparation Example 1, except that the amounts nickel sulfate ($NiSO_4.6H_2O$), cobalt sulfate ($CoSO_4.7H_2O$), and aluminum nitrate ($Al(NO_3)_3 \cdot 9H_2O$) (used as raw materials for the nickel-based active material) were changed to a molar ratio of 85:10:5, and the reaction was carried out for 18 hours.

Preparation Example 5: Preparation of Composite Metal Hydroxide ($Ni_{0.33}Co_{0.33}Mn_{0.33}(OH)_2$)

Composite metal hydroxide ($Ni_{0.33}Co_{0.33}Mn_{0.333}(OH)_2$), which was radially aligned, porous, and had a plate particle shape, was obtained in the same manner as in Preparation Example 1, except that amounts of nickel sulfate, cobalt sulfate, and manganese sulfate were changed to a molar ratio of 1:1:1 and the reaction was carried out for 28 hours.

Example 1: Preparation of Secondary Particles of Nickel-Based Active Material ($LiNi_{0.6}Co_{0.2}Mn_{0.2}O_2$—$ZrO_2$)

The composite metal hydroxide powder of Preparation Example 1 ($Ni_{0.6}Co_{0.2}Mn_{0.2}(OH)_2$) and lithium hydroxide ($LiOH.H_2O$) having an average diameter of about 10 μm were mixed at a molar ratio of 1:1 using a high-speed mixer at a rate of 2,000 rpm. The exhaust port of a calcining furnace was opened, and a first heat treatment was performed on the mixture at a temperature of about 800° C. for about 6 hours in air, thereby yielding secondary particles A of the nickel-based active material ($LiNi_{0.6}Co_{0.2}Mn_{0.2}O_2$) (nickel-based active material intermediate).

Zirconium oxide was dry-mixed with the secondary particle A of a nickel-based active material using a high speed mixer at a rate of 2,000 rpm. The amount of zirconium in the zirconium oxide was controlled to be 0.0015 mol based on 1 mol of the transition metal of the secondary particles of the nickel-based active material. Here, the transition metal is a metal containing nickel, cobalt, and manganese.

The mixture obtained after dry mixing was subjected to a second heat treatment at a temperature of about 850° C. for 6 hours in an oxygen atmosphere with the exhaust port closed to obtain secondary particles B of a nickel-based active material ($LiNi_{0.6}Co_{0.2}Mn_{0.2}O_2$) in which zirconium oxide was coated on the primary particles.

Example 2: Preparation of Secondary Particles of Nickel-Based Active Material ($LiNi_{0.6}Co_{0.2}Mn_{0.2}O_2$—$ZrO_2$)

Secondary particles of a nickel-based active material ($LiNi_{0.6}Co_{0.2}Mn_{0.2}O_2$), in which zirconium oxide was coated on the primary particles, were obtained in the same manner as in Example 1, except that the second heat treatment temperature was changed to 870° C.

Example 3: Preparation of Secondary Particles of Nickel-Based Active Material ($LiNi_{0.6}Co_{0.2}Mn_{0.2}O_2$—$Al_2O_3$)

Secondary particles of a nickel-based active material ($LiNi_{0.6}Co_{0.2}Mn_{0.2}O_2$), in which zirconium oxide was coated on the primary particles, were obtained in the same manner as in Example 1, except that aluminum oxide was used instead of zirconium oxide.

Example 4: Preparation of Secondary Particles of Nickel-Based Active Material ($LiNi_{0.6}Co_{0.2}Mn_{0.2}O_2$—$TiO_2$)

Secondary particles of a nickel-based active material ($LiNi_{0.6}Co_{0.2}Mn_{0.2}O_2$), in which titanium oxide was coated on the primary particles, were obtained in the same manner as in Example 2, except that titanium oxide was used instead of zirconium oxide.

Example 5: Preparation of Coin Cell

A lithium secondary battery (coin cell) was prepared by using the secondary particles of the nickel-based active material ($LiNi_{0.6}Co_{0.2}Mn_{0.2}O_2$) including a zirconium oxide coating prepared according to Example 1, as follows.

96 g of the secondary particles of the nickel-based active material ($LiNi_{0.6}Co_{0.2}Mn_{0.2}O_2$) including a zirconium oxide coating prepared according to Example 1, 2 g of polyvinylidene fluoride, 137 g of N-methylpyrrolidone (as a solvent), and 2 g of carbon black (as a conductive agent) were mixed. Bubbles were removed from the mixture using a blender to prepare slurry for forming a positive active material layer in which components were uniformly dispersed.

The slurry for forming the positive active material layer prepared according to the above procedure was coated on an aluminum foil current collector using a doctor blade to form a thin electrode plate. The thin electrode plate was dried at 135° C. for 3 hours or more, and then subjected to rolling and vacuum drying, thereby completing the manufacture of a positive electrode.

The positive electrode was combined with a lithium metal electrode (used as a counter electrode) to manufacture a CR2032-type coin half-cell. A separator (thickness: about 16 μm) formed of a porous polyethylene (PE) film, was positioned between the positive electrode and the lithium metal counter electrode. Then, an electrolyte was provided thereto, thereby completing manufacture of a CR2032-type coin-full cell. A solution containing 1.1M $LiPF_6$ dissolved in a mixed solution of ethylene carbonate (EC) and ethylmethylcarbonate (EMC) at a volumetric ratio of 3:5 was used as the electrolyte.

Example 6 Preparation of Coin Cell

A CR2032 type coin cell was manufactured in the same manner as in Example 5, except that the secondary particles of the nickel-based active material ($LiNi_{0.6}Co_{0.2}Mn_{0.2}O_2$) including an aluminum oxide coating prepared according to Example 3 was used instead of the secondary particles of the nickel-based active material ($LiNi_{0.6}Co_{0.2}Mn_{0.2}O_2$)) including a zirconium oxide coating was coated on primary particles prepared according to Example 1.

Example 7: Preparation of Secondary Particles of Nickel-Based Active Material ($LiNi_{0.6}Co_{0.2}Mn_{0.2}O_2$—$TiO_2$)

Secondary particles of the nickel-based active material ($LiNi_{0.6}Co_{0.2}Mn_{0.2}O_2$) including a titanium oxide coating were prepared in the same manner as in Example 1, except that titanium oxide was used instead of zirconium oxide.

Example 8: Preparation of Secondary Particles of Nickel-Based Active Material ($LiNi_{0.6}Co_{0.2}Mn_{0.2}O_2$—$LiBO_2$)

Secondary particles of the nickel-based active material ($LiNi_{0.6}Co_{0.2}Mn_{0.2}O_2$) including a lithium boron oxide coating were prepared in the same manner as in Example 1, except that boron oxide ($B_2O_3$) was used instead of zirconium oxide, and the amount of boron of the boron oxide was 0.0005 mol based on 1 mol of the transition metal of the secondary particles of the nickel-based active material.

Example 9: Preparation of Secondary Particles of Nickel-Based Active Material ($LiNi_{0.6}Co_{0.2}Mn_{0.2}O_2$—$WO_3$)

Secondary particles of a nickel-based active material ($LiNi_{0.6}Co_{0.2}Mn_{0.2}O_2$) including a tungsten oxide coating were obtained in the same manner as in Example 1, except that tungsten chloride ($WCl_6$) was used instead of zirconium oxide.

Example 10: Preparation of Secondary Particles of Nickel-Based Active Material ($LiNi_{0.6}Co_{0.2}Mn_{0.2}O_2$—$LiPO_4$)

Secondary particles of the nickel-based active material ($LiNi_{0.6}Co_{0.2}Mn_{0.2}O_2$) including a lithium phosphorus oxide coating were prepared in the same manner as in Example 2, except that ammonium phosphate monohydrate ($NH_4H_2PO_4$) was used instead of zirconium oxide, and the amount of phosphorous (as ammonium phosphate monohydrate) was 0.003 mol based on 1 mol of the transition metal of the secondary particles of the nickel-based active material.

Example 11: Preparation of Secondary Particles of Nickel-Based Active Material ($LiNi_{0.6}Co_{0.2}Mn_{0.2}O_2$—$ZrO_2$)

Secondary particles of the nickel-based active material ($LiNi_{0.5}Co_{0.2}Mn_{0.3}O_2$) including a zirconium oxide coating were obtained in the same manner as in Example 1, except that the radial and porous composite metal hydroxide ($Ni_{0.5}Co_{0.2}Mn_{0.3}(OH)_2$) of Preparation Example 2 was used instead of the radial and porous composite metal hydroxide ($Ni_{0.6}Co_{0.2}Mn_{0.2}(OH)_2$) of Preparation Example 1, a temperature at which the second heat treatment was performed was changed to 890° C.

Example 12: Preparation of Secondary Particles of Nickel-Based Active Material ($LiNi_{0.8}Co_{0.1}Mn_{0.1}O_2$—$ZrO_2$)

Secondary particles of the nickel-based active material ($LiNi_{0.8}Co_{0.1}Mn_{0.1}O_2$) including a zirconium oxide coating were obtained in the same manner as in Example 1, except that the composite metal hydroxide ($LiNi_{0.8}Co_{0.1}Mn_{0.1}(OH)_2$) of Preparation Example 3 was used instead of the radial and porous composite metal hydroxide ($Ni_{0.6}Co_{0.2}Mn_{0.2}(OH)_2$) of Preparation Example 1, a temperature at which the first heat treatment was performed was changed to 700° C., and a temperature at which the second heat treatment was performed was changed to 770° C.

Example 13: Preparation of Secondary Particles of Nickel-Based Active Material ($LiNi_{0.85}Co_{0.1}Al_{0.05}O_2$—$ZrO_2$)

Secondary particles of the nickel-based active material ($LiNi_{0.85}Co_{0.1}Al_{0.05}O_2$) including a zirconium oxide coating were obtained in the same manner as in Example 1, except that the composite metal hydroxide ($Ni_{0.85}Co_{0.1}Al_{0.05}(OH)_2$) of Preparation Example 4 was used instead of the radial and porous composite metal hydroxide ($Ni_{0.6}Co_{0.2}Mn_{0.2}(OH)_2$) of Preparation Example 1, a temperature at which the first heat treatment was performed was changed to 650° C., and a temperature at which the second heat treatment was performed was changed to 720° C.

Example 14: Preparation of Secondary Particles of Nickel-Based Active Material ($LiNi_{0.33}Co_{0.33}Mn_{0.333}O_2$—$ZrO_2$)

Secondary particles of the nickel-based active material ($LiNi_{0.33}Co_{0.33}Mn_{0.333}O_2$) including a zirconium oxide coating were obtained in the same manner as in Example 1, except that the composite metal hydroxide ($Ni_{0.33}Co_{0.33}Mn_{0.333}(OH)_2$) of Preparation Example 5 was used instead of the radial and porous composite metal hydroxide ($Ni_{0.6}Co_{0.2}Mn_{0.2}(OH)_2$) of Preparation Example 1, a temperature at which the second heat treatment was performed was changed to 900° C.

Example 15: Preparation of Secondary Particles of Nickel-Based Active Material ($LiNi_{0.6}Co_{0.2}Mn_{0.2}O_2$—$ZrO_2$)

A nickel-based active material was prepared in the same manner as in Example 1, except that the temperature at which the first heat treatment was performed was changed to 600° C. for 6 hours.

Example 16: Preparation of Secondary Particles of Nickel-Based Active Material ($LiNi_{0.6}Co_{0.2}Mn_{0.2}O_2$—$ZrO_2$)

A nickel-based active material was prepared in the same manner as in Example 1, except that the temperature at which the second heat treatment was performed was changed to 900° C. for 6 hours.

Example 17-26: Preparation of Coin Cell

CR2032 type coin cells were manufactured in the same manner as in Example 5, except that the secondary particles of the nickel-based active material including a heteroelement compound coating prepared according to Examples 7-16 were used instead of the secondary particle of the nickel-based active material ($LiNi_{0.6}Co_{0.2}Mn_{0.2}O_2$) including a zirconium oxide coating prepared according to Example 1.

Comparative Preparation Example 1: Preparation of Composite Metal Hydroxide ($Ni_{0.6}Co_{0.2}Mn_{0.2}(OH)_2$)

A composite metal hydroxide ($Ni_{0.6}Co_{0.2}Mn_{0.2}(OH)_2$) with no pores and no radial alignment (e.g., of primary particles) was prepared in the same manner as in Preparation Example 1, except that a continuous-type reactor was used instead of the batch-type reactor, and the reaction progressed at a slow particle growth rate for 80 hours until the resulting composite metal hydroxide had attained a desired size. Once the reaction reached a steady state (stabilization), the overflow reactants were collected and the reaction was dried.

Comparative Preparation Example 2: Preparation of Composite Metal Hydroxide ($Ni_{0.6}Co_{0.2}Mn_{0.2}(OH)_2$)

Composite metal hydroxide ($Ni_{0.6}Co_{0.2}Mn_{0.2}(OH)_2$) having pores but no radial alignment was prepared in the same manner as in Comparative Preparation Example 1, except that the reaction progressed at a slow particle growth rate of the for 20 hours until the resulting composite metal hydroxide had a desired size.

Comparative Example 1: Preparation of Secondary Particles of Nickel-Based Active Material ($LiNi_{0.6}Co_{0.2}Mn_{0.2}O_2$)

The composite metal hydroxide ($Ni_{0.6}Co_{0.2}Mn_{0.2}(OH)_2$) with no pores and no radial alignment of Comparative Preparation Example 1 and lithium hydroxide (LiOH) having an average diameter of about 10 μm were mixed at a molar ratio of 1:1 and milled according to a dry process at a rate of 2,000 rpm. The exhaust port of a calcining furnace was opened, and a first heat treatment was performed on the mixture in air at a temperature of about 870° C. for 15 hours. After the exhaust port of the calcining furnace was closed, a second heat treatment was performed on the products of the first heat treatment in air at a temperature of about 500° C. for 6 hours, thereby yielding a secondary particle of the nickel-based active material ($LiNi_{0.6}Co_{0.2}Mn_{0.2}O_2$).

Comparative Example 2: Preparation of Secondary Particles of Nickel-Based Active Material ($LiNi_{0.6}Co_{0.2}Mn_{0.2}O_2$)

The composite metal hydroxide ($Ni_{0.6}Co_{0.2}Mn_{0.2}(OH)_2$) having pores but no radial alignment of Comparative Preparation Example 2 and lithium hydroxide (LiOH) having an average particle diameter of about 10 μm were mixed at a molar ratio of 1:1 and milled according to a dry process at a rate of 2,000 rpm. The exhaust port of a calcining furnace was opened and heat treatment was performed on the mixture in air at a temperature of about 880° C. for 15 hours, thereby yielding secondary particles of the nickel-based active material ($LiNi_{0.6}Co_{0.2}Mn_{0.2}O_2$).

Comparative Example 3: Preparation of Coin Cell

A coin cell was manufactured in the same manner as in Example 5, except that the secondary particles of the nickel-based active material ($LiNi_{0.6}Co_{0.2}Mn_{0.2}O_2$) prepared according to Comparative Example 1 were used instead of the secondary particles of the nickel-based active material ($LiNi_{0.6}Co_{0.2}Mn_{0.2}O_2$ including a zirconium oxide coating, prepared according to Example 1.

Comparative Example 4: Preparation of Coin Cell

A coin cell was manufactured in the same manner as in Example 5, except that the secondary particles of the nickel-based active material ($LiNi_{0.6}Co_{0.2}Mn_{0.2}O_2$) prepared according to Comparative Example 2 were used instead of the secondary particles of the nickel-based active material (LiNi$_{0.6}$Co$_{0.2}$Mn$_{0.2}$O$_2$) prepared according to Example 1.

Comparative Example 5: Preparation of Nickel-Based Active Material (Ni$_{0.6}$Co$_{0.2}$Mn$_{0.2}$O$_2$)

Secondary particles of a nickel-based active material were obtained in the same manner as in Example 1, except that a first heat treatment was performed on a mixture of the composite metal hydroxide (Ni$_{0.6}$Co$_{0.2}$Mn$_{0.2}$(OH)$_2$) of Comparative Preparation Example 1 and lithium hydroxide (LiOH) having an average particle diameter of about 10 µm in air at a temperature of about 500° C. for 6 hours after an exhaust port of a calcining furnace was opened.

Comparative Example 6: Preparation of Nickel-Based Active Material (Ni$_{0.6}$Co$_{0.2}$Mn$_{0.2}$O$_2$)

Secondary particles of a nickel-based active material were obtained in the same manner as in Example 1, except that a first heat treatment was performed on a mixture of the composite metal hydroxide (Ni$_{0.6}$Co$_{0.2}$Mn$_{0.2}$(OH)$_2$) of Comparative Preparation Example 1 and lithium hydroxide (LiOH) having an average diameter of about 10 µm at a temperature of about 870° C. and a second heat treatment was performed thereon in air at a temperature of about 800° C.

Comparative Example 7-8: Preparation of Coin Cells

Coin cells were manufactured in the same manner as in Example 5, except that the nickel-based active material prepared according to Comparative Example 5 and the nickel-based active material prepared according to Comparative Example 6 were used instead of the secondary particle of the nickel-based active material coated with zirconium oxide prepared according to Example 1.

Reference Example 1: Preparation of Nickel-Based Active Material (LiNi$_{0.6}$Co$_{0.2}$Mn$_{0.2}$O$_2$)

The same experiment was performed as in Example 2, except that zirconium oxide was not mixed with the secondary particle of the nickel-based active material (LiNi$_{0.6}$Co$_{0.2}$Mn$_{0.2}$O$_2$) prepared according to Example 1.

Reference Example 2: Preparation of Coin Cell

A CR2032 type coin cell was manufactured in the same manner as in Example 5, except that the uncoated nickel-based active material (LiNi$_{0.6}$Co$_{0.2}$Mn$_{0.2}$O$_2$) prepared according to Reference Example 1 was used instead of the secondary particle of the nickel-based active material (LiNi$_{0.6}$Co$_{0.2}$Mn$_{0.2}$(OH)$_2$) including a zirconium oxide coating, prepared according to Example 1.

Evaluation Example 1: Electron Scanning Microscope Analysis and Element Distribution Analysis (Nano-SIMS)

1) Example 1 and Comparative Examples 1 and 2

Secondary particles of the nickel-based active materials of Example 1 and Comparative Examples 1 and 2 were analyzed by using a scanning electron microscope (SEM). The scanning electron microscope used herein was Magellan 400L (manufactured by FEI Company, Hillsboro, Oreg.). A pretreatment was performed on a sample cross-section by milling using a JEOL CP2 for 4 hours at a voltage of 6 kV and a current of 150 uA. Then, the electron scanning analysis was performed under the conditions of 3.1 pA SE.

Figure 3A:
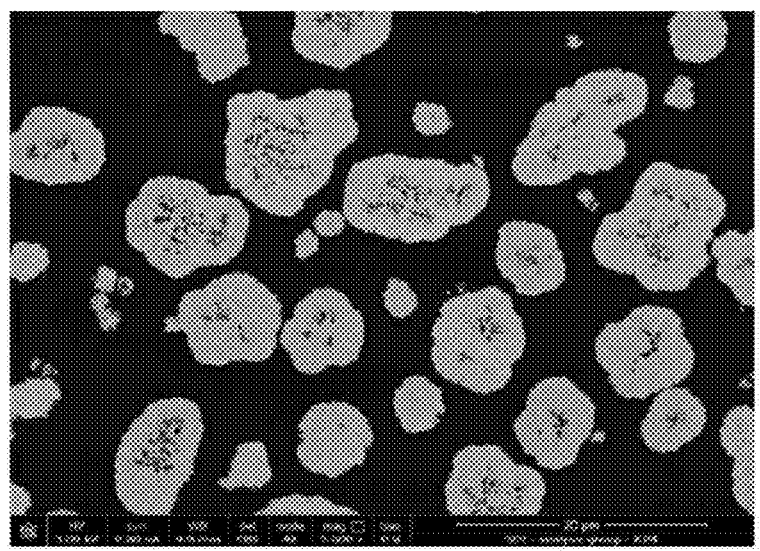
FIGS. 3A-3C are scanning electron microscope (SEM) images of cross-sections of a secondary particle intermediate (nickel-based active material A) of the nickel-based active material prepared according to Example 1.
Figure 3B:
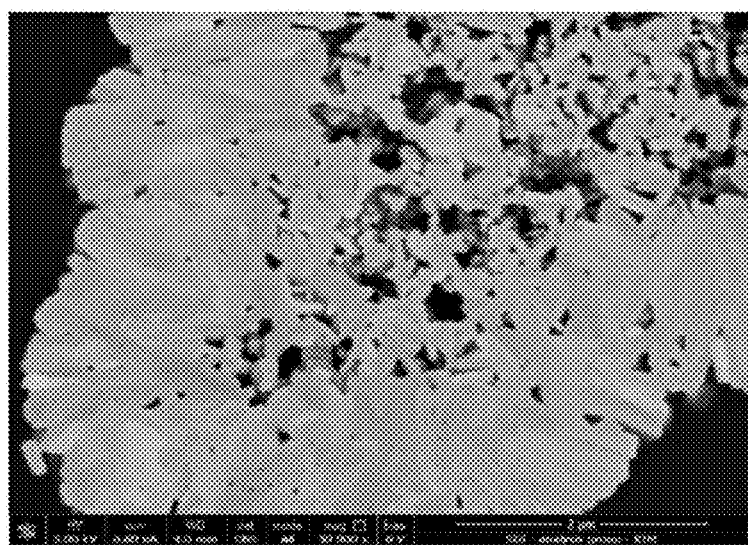
Figure 3C:
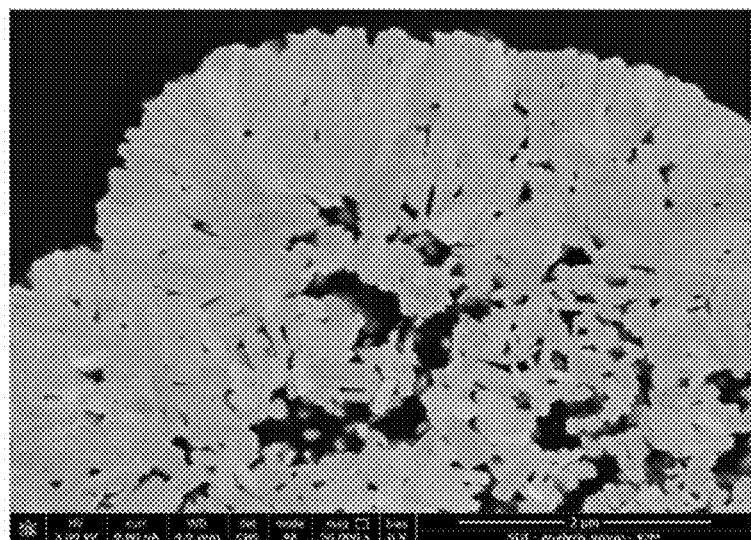
Figure 3D:
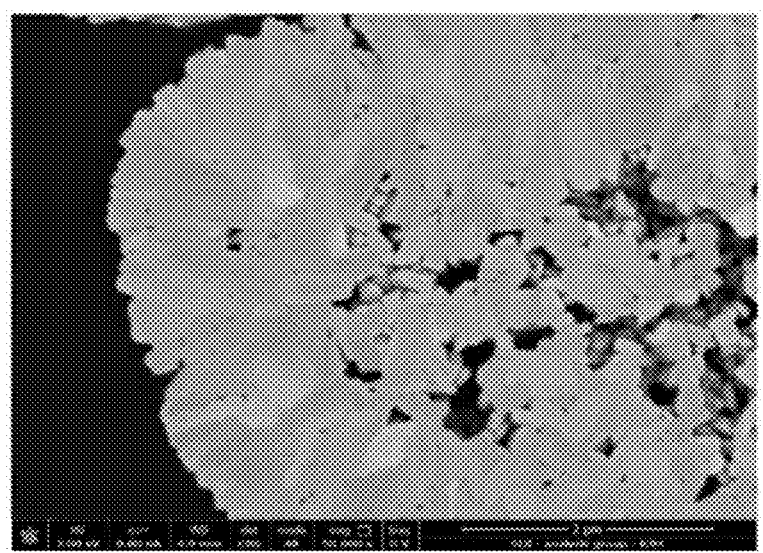
FIGS. 3D and 3E are scanning electron microscope (SEM) images of a cross-section and an outer surface, respectively, of a secondary particle final product (nickel-based active material B) of the nickel-based active material prepared according to Example 1. The arrows in FIG. 3E indicate the presence of pores.
Figure 3E:
Figure 3F:
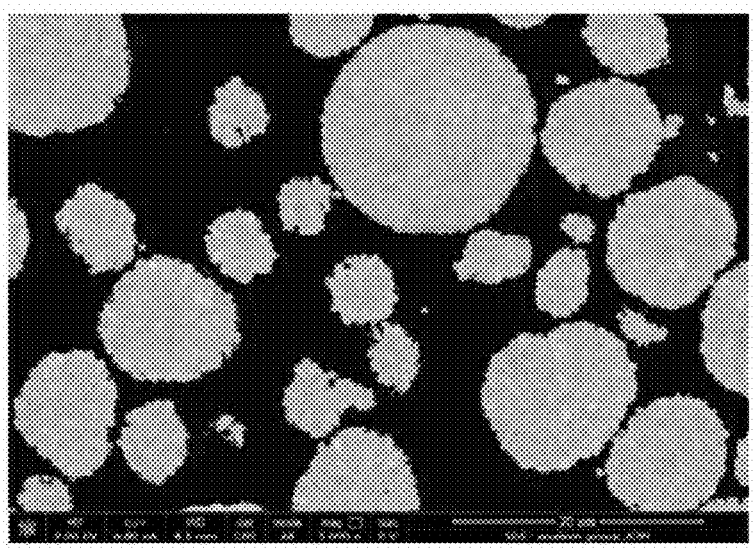
FIGS. 3F-3G and 3H are SEM images of cross-sections and an outer surface, respectively, of particles of the nickel-based active material prepared according to Comparative Example 1.
Figure 3G:
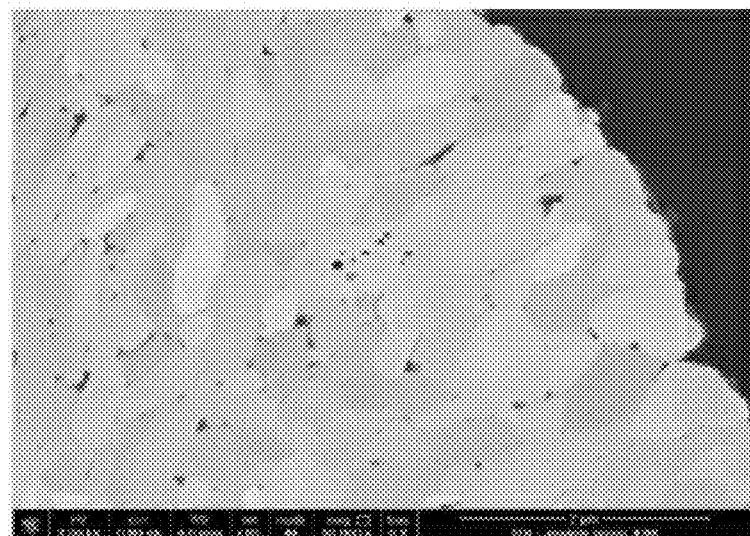
Figure 3H:
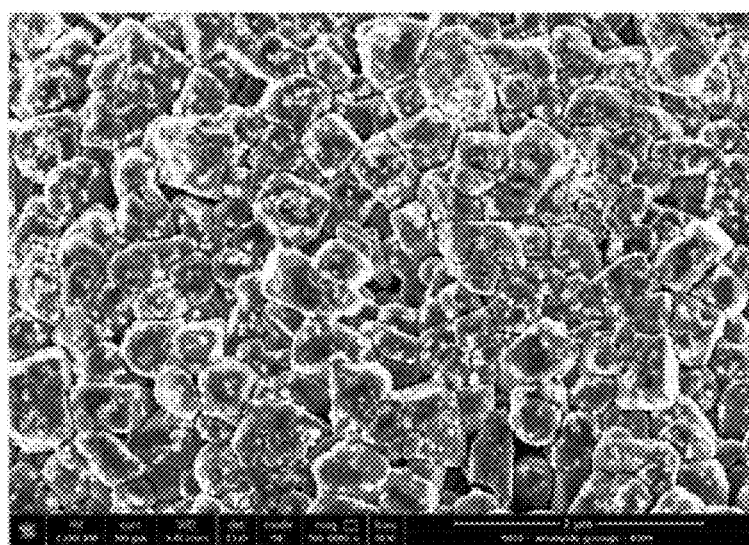
Figure 3I:
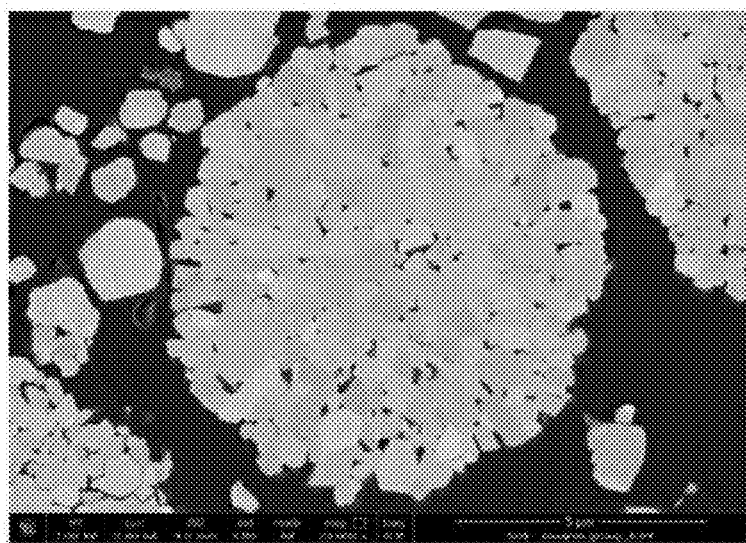
FIGS. 3I-3J are SEM images of a nickel-based active material prepared according to Comparative Example 2.
Figure 3J:
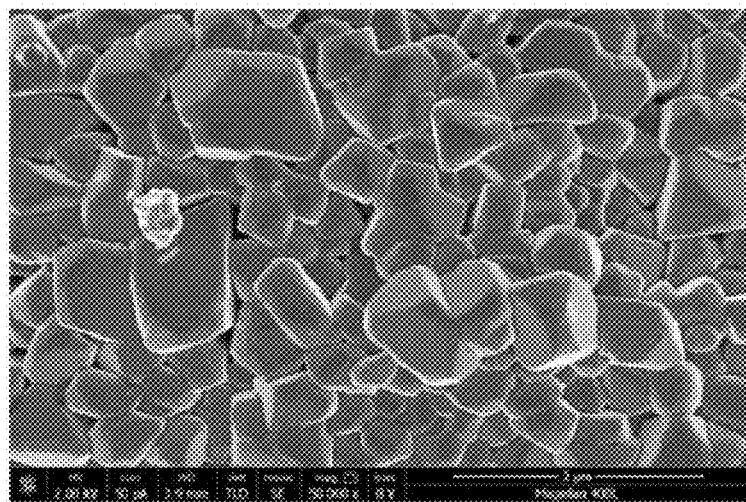

The results of the analysis are shown in FIGS. 3A-3J. FIGS. 3A-3C are scanning electron microscope (SEM) images of cross-sections of Intermediate A of the secondary particle of the nickel-based active material of Example 1. FIGS. 3D and 3E are SEM images of a cross-section and an outer surface, respectively, of the secondary particle B of the nickel-based active material of Example 1. FIGS. 3F-3G and 3H are SEM images of cross-sections and an outer surface, respectively, of the nickel-based active material of Comparative Example 1. FIGS. 3I-3J are SEM images of the nickel-based active material of Comparative Example 2.

Referring to FIGS. 3A-3C, in the Intermediate A of the secondary particle of the nickel-based active material of Example 1, the outer portion has a radially arranged structure and a number of pores, and the inner portion has an irregular porous structure.

Referring to FIG. 3D, it was found that the secondary particles B of the nickel-based active material of Example 1 were densified as compared with Intermediate A of the secondary particle of the nickel-based active material (see FIGS. 3A-3C) that had been subjected to only the first heat treatment through the secondary heat treatment.

As shown in FIG. 3B-FIG. 3D, the inner portion of the secondary particles of the nickel-based active material obtained according to Example 1 had disc-shaped plate (primary) particles, and the length of the plate-type particles of the inner portion is relatively short compared with the length of the plate-type particles of the outer portion. In addition, the outer portion of the secondary particles showed a long radial structure in the longer axis direction.

As shown in FIG. 3E, the surface of the secondary particles of the nickel-based active material of Example 1 includes pores (indicated by arrows) which are open toward the inner portion and have an average size (diameter) of less than about 150 nm.

As shown in FIGS. 3F-3H, the nickel-based active material of Comparative Example 1, unlike the case of Example 1, showed that the primary particles were round, randomly aligned, and had almost no pores. As shown in FIGS. 3I and 3J, the nickel-based active material of Comparative Example 2 has round primary particles, which are randomly aligned. Although there are pores, the pores are uniformly distributed throughout the inner portion and the outer portion, and have no radial alignment.

2) Comparative Examples 5 and 6

The nickel-based active materials prepared according to Comparative Examples 5 and 6 were analyzed by using the above-described Magellan 400L scanning electron microscope. A pretreatment was performed on a sample cross-section by milling using a JEOL CP2 for 4 hours at a voltage of 6 kV and a current of 150 uA. Then, the electron scanning analysis was performed under the conditions of 3.1 pA SE.

Figure 3K:
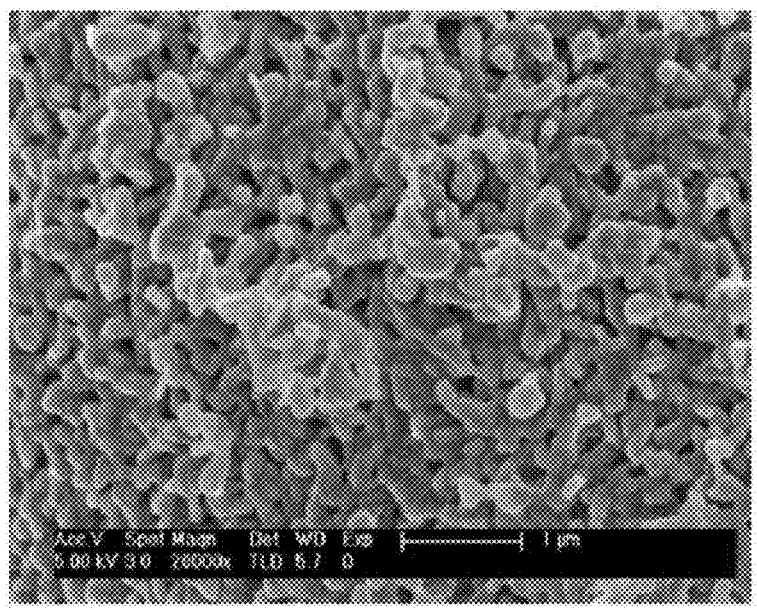
FIGS. 3K-3L are SEM images of nickel-based active materials prepared according to Comparative Examples 5 and 6, respectively.
Figure 3L:
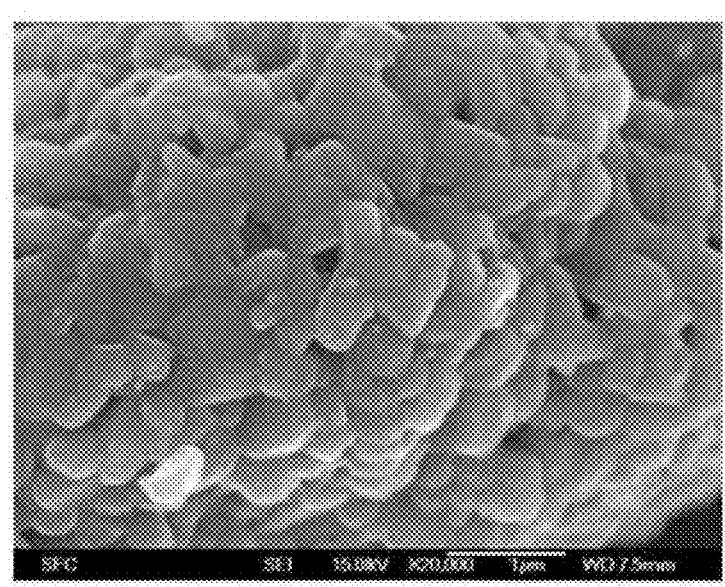
Figure 4A:
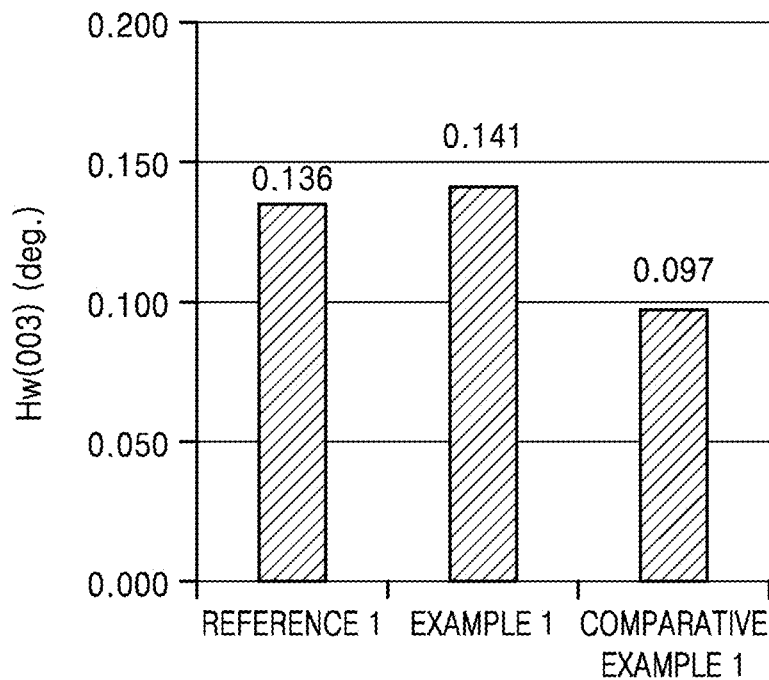
FIGS. 4A-4D are graphs comparing the full width at half maximum (FWHM) values (in degrees) of X-ray diffraction peaks corresponding to reflections of the (003), (104), (018), and (110) planes, respectively, for nickel-based active materials prepared in Example 1, Reference Example 1, and Comparative Example 1.
Figure 4B:
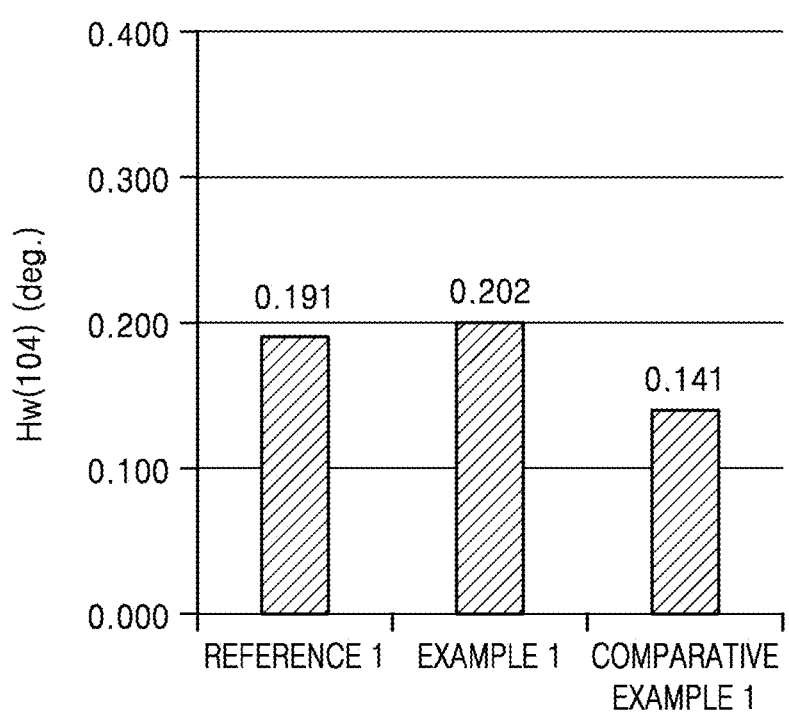
Figure 4C:
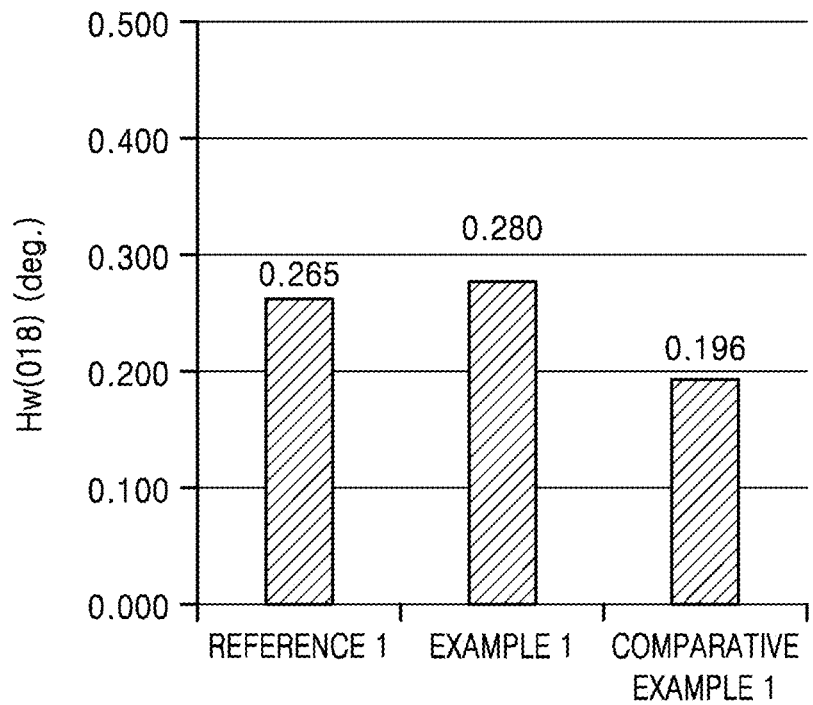
Figure 4D:
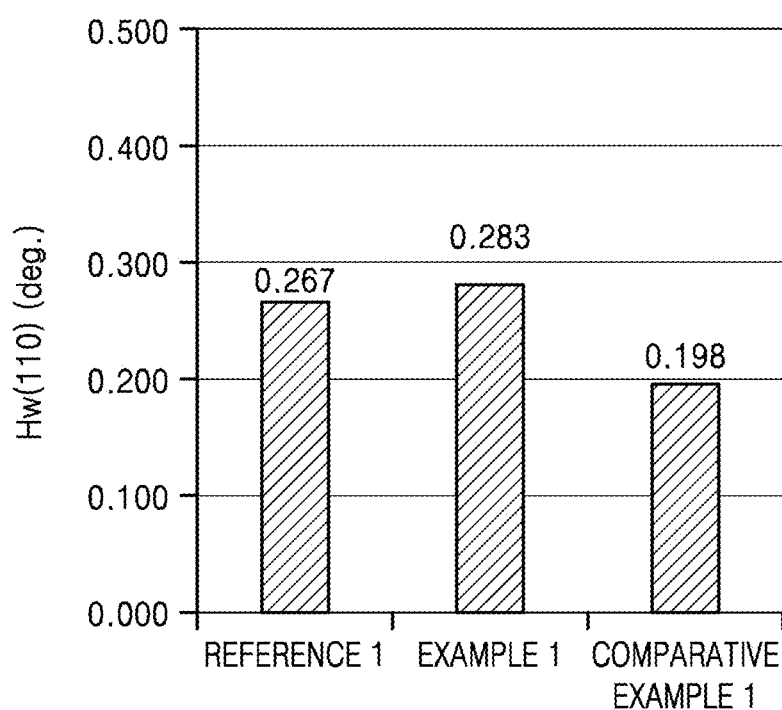

As shown in FIG. 3K, the temperature at which the first heat treatment was performed was not sufficiently high for the nickel-based active material prepared according to Comparative Example 5 to form an appropriate active material. The nickel-based active material was not sufficiently reacted with lithium. As shown in FIG. 3L, no pores were formed between the primary particles of the nickel-based active material prepared according to Comparative Example 6 and the hetero-elements were distributed only on the surface of the secondary particles of the nickel-based active material, which thereby exhibited relatively low efficiency and low lifespan characteristics.

3) Example 2 and Reference Example 1

The nickel-based active material including a zirconium oxide coating prepared according to Example 2 and the nickel-based active material prepared according to Reference Example 1 were analyzed using the above-described Magellan 400L scanning electron microscope. A pretreatment was performed on a sample cross-section by milling using a JEOL CP2 for 4 hours at a voltage of 6 kV and a current of 150 uA. Then, the electron scanning analysis was performed under the conditions of 3.1 pA SE.

Figure 9A:
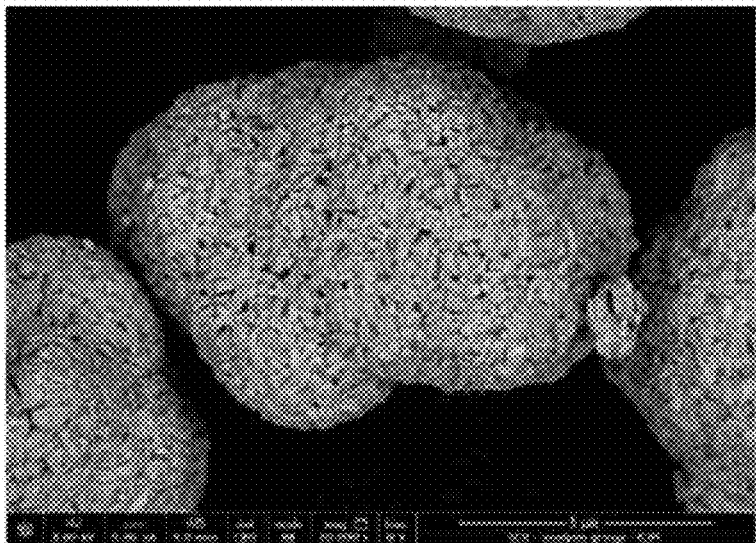
FIGS. 9A-9B are SEM images of a nickel-based active material prepared according to Example 2, in which zirconium oxide is coated on primary particles of the nickel-based active material. The square overlay indicates a portion of the image that was subsequently subjected to surface energy dispersive X-ray spectroscopy (EDS) analysis.
Figure 9B:
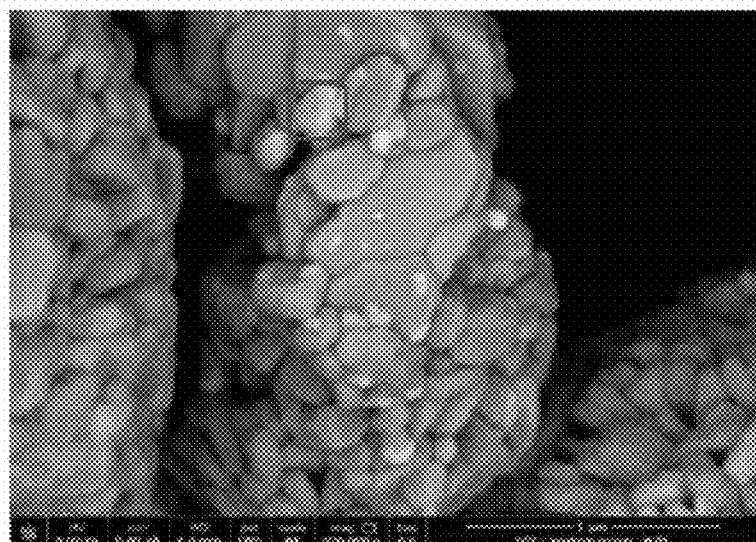

The results of the SEM analysis of the nickel-based active material including a zirconium oxide coating prepared according to Example 2 are shown in FIGS. 9A and 9B. In FIG. 9B, the square overlay encloses a region including zirconium oxide, and the region was subjected to surface energy dispersive X-ray spectroscopy (EDS) analysis.

Figure 10A:
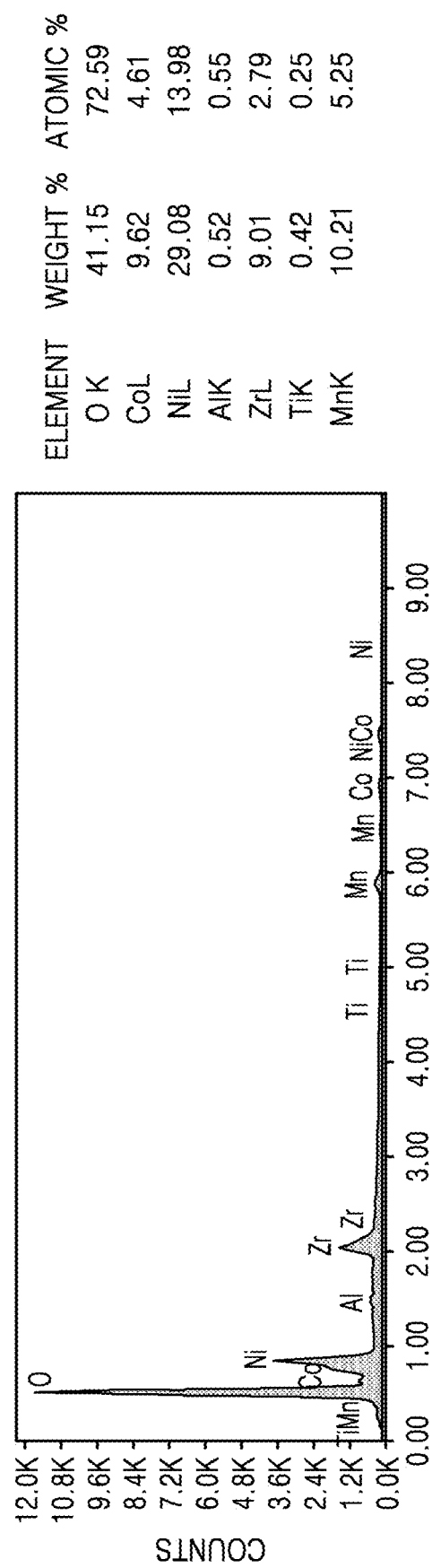
FIG. 10A shows the results of EDS analysis for a portion of the image shown in FIG. 9B.

FIG. 10A is a graph showing the EDS spectrum of the portion of the particle enclosed in the square in FIG. 9B. The EDS spectrum shows peaks corresponding to the presence of oxygen (O), nickel (Ni), zirconium (Zr), cobalt (Co), a and manganese (Mn), which is consistent with the presence of a zirconium oxide (ZrO2) particle on the surface of $LiNi_{0.6}Co_{0.2}Mn_{0.2}O_2$.

Figure 9C:
FIGS. 9C-9D are SEM images of nickel-based active materials prepared according to Reference Example 1.
Figure 9D:

The results of the SEM analysis of the nickel-based active material prepared according to Reference Example 1 are shown in FIGS. 9C and 9D.

In comparison, FIGS. 9C and 9D do not include a zirconium oxide was coated on primary particles.

4) Example 3

Figure 10B:
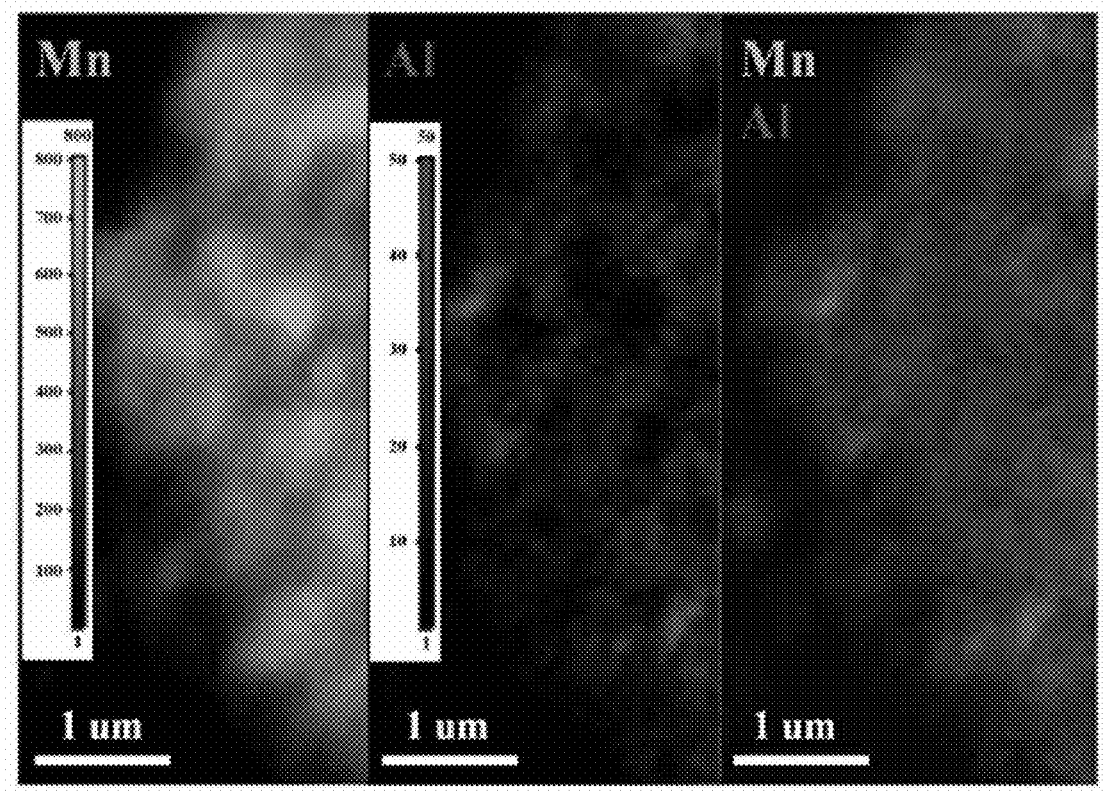
FIG. 10B shows the results of a secondary ion mass spectroscopy analysis of Example 3. The left section of the image shows a spatial map of manganese (Mn) concentration, and the middle section of the image shows a spatial map of aluminum (Al) concentration, where lighter colors indicate higher concentrations of the elements, as shown in the respective legends. The right section of the image shows a superposition (overlay) of the Mn and Al maps.

The distribution of aluminum in secondary particles of the nickel-based active material including an aluminum oxide coating prepared according to Example 3 was analyzed by secondary ion mass spectroscopy (Nano-SIMS). A pretreatment was performed on a sample cross-section by milling using a JEOL CP2 for 4 hours at a voltage of 6 kV and a current of 150 uA. Afterwards, primary ions having a size of about 50 nm were injected into the sample, and the amount of secondary ions discharged therefrom was measured to determine the spatial distribution of aluminum and manganese. In FIG. 10B, the left section of the image shows a spatial map of manganese (Mn) concentration, and the middle section of the image shows a spatial map of aluminum (Al) concentration, where lighter colors indicate higher concentrations of the elements, as shown in the respective legends. The right section of the image shows a superposition (overlay) of the Mn and Al maps. As shown in FIG. 10B, the aluminum appeared mostly at grain boundaries having low manganese content (which is a transition metal included in the active material). Accordingly, it was confirmed that aluminum oxide was distributed at grain boundaries of primary particles of the nickel-based active material.

5) Example 2 and Reference Example 1

Figure 11A:
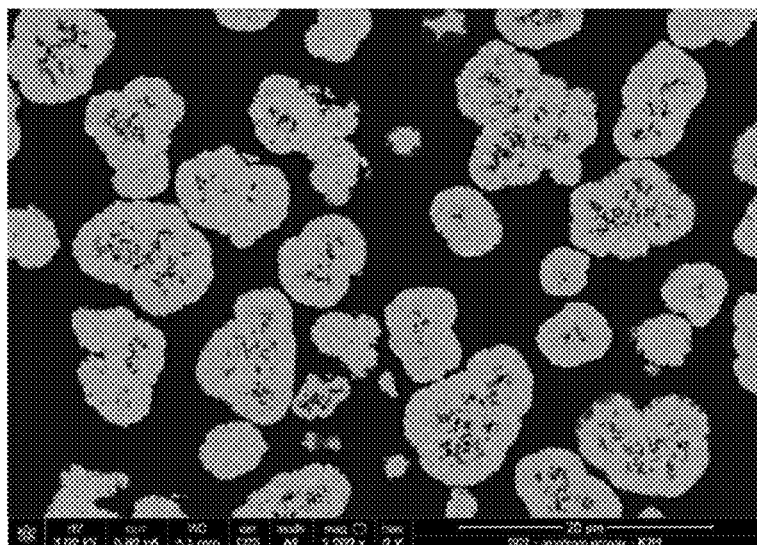
FIG. 11A is an SEM image of cross-sections of a nickel-based active material prepared according to Example 2, in which zirconium oxide is coated on primary particles of the nickel-based active material.
Figure 11B:
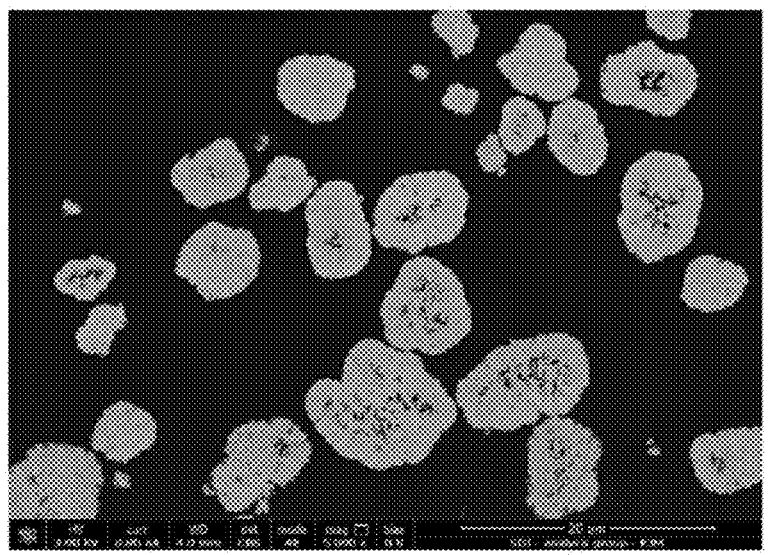
FIG. 11B is an SEM image of cross-sections of a secondary particle of a nickel-based active material prepared according to Reference Example 1.

SEM analysis was performed on cross-sections of the nickel-based active materials prepared according to Example 2 and Reference Example 1, and the results of the analysis are shown in FIGS. 11A and 11B.

As a result of the analysis, it was confirmed that, due to the coating of zirconium oxide between primary particles, the nickel-based active material prepared according to Example 2 had a denser structure with a reduced gap between primary particles, compared to the structure of the nickel-based active material prepared according to Reference Example 1.

6) Example 1

The secondary particle of the nickel-based active material of Example 1 was analyzed by using the above-described Magellan 400L scanning electron microscope. A pretreatment was performed on a sample cross-section by milling using a JEOL CP2 for 4 hours at a voltage of 6 kV and a current of 150 uA. Then, the electron scanning analysis was performed under the conditions of 3.1 pA SE. An SEM image of the surface of the secondary particle of the nickel-based active material is shown in FIG. 15A, and an SEM image of a cross-section of the secondary particle of the nickel-based active material is shown in FIG. 15B.

Figure 15A:
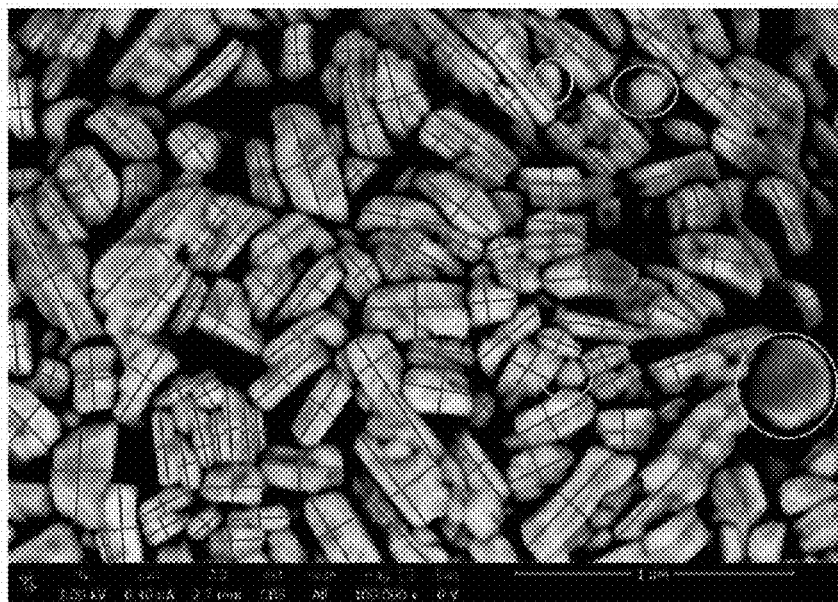
FIG. 15A is an SEM image of the surface of a secondary particle of a nickel-based active material prepared according to Example 1, in which the plate-shaped primary particles constituting the secondary particle are each analyzed with respect to their plane direction and thickness direction. The shorter lines indicate the measurement along the thickness direction, the longer lines perpendicular to the shorter lines indicate the measurements along the plane direction, and the circles indicate particles that are not radially aligned.
Figure 15B:
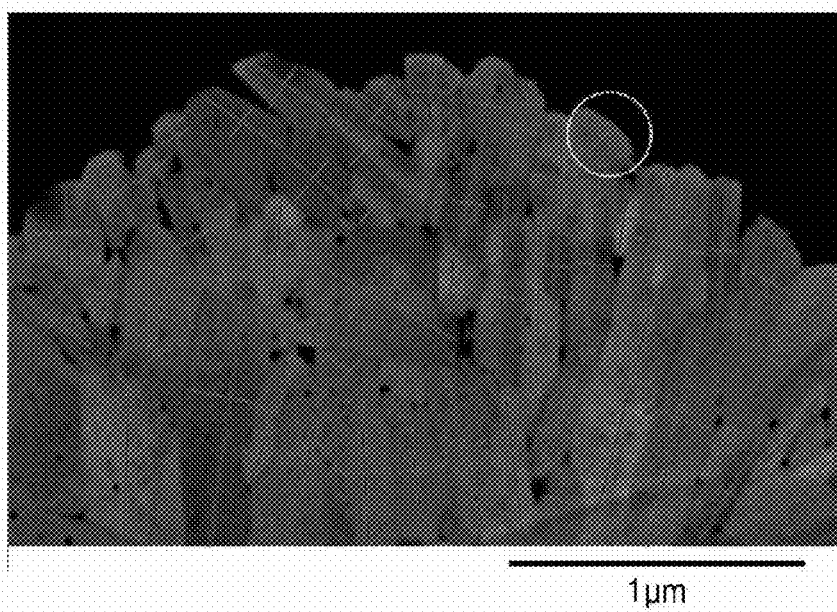
FIG. 15B is an SEM image of a cross-section of a secondary particle of a nickel-based active material prepared according to Example 1, in which the plate-shaped primary particles constituting the secondary particle are each analyzed with respect to their plane direction and thickness direction. The shorter lines indicate the measurement along the thickness direction, the longer lines perpendicular to the shorter lines indicate the measurements along the plane direction, and the circles indicate particles that are not radially aligned.

FIGS. 15A and 15B indicate that most of the plate primary particles of the nickel-based active material were radially aligned, (as determined by the orientations of the plane and thickness directions of the particle, designated by the overlaid longer and shorter lines, respectively), while some of the primary particles were non-radially aligned (as highlighted by the circles). Here, the amount (e.g., proportion) of such non-radially aligned plate particles was about 3 wt % based on 100 wt % of the total weight of the radial plate particles and the non-radial plate particles.

Figure 17A:
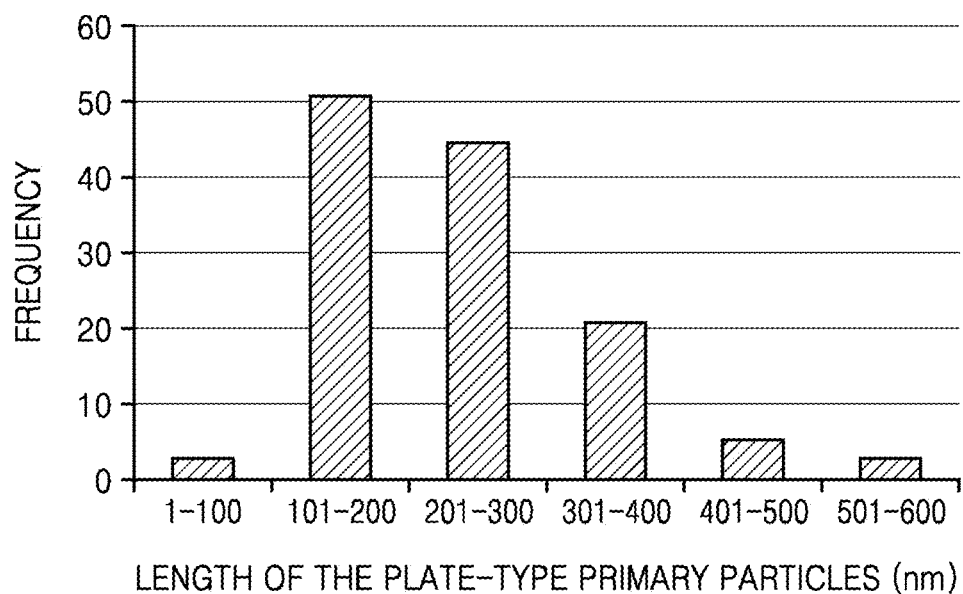
FIGS. 17A-17C are graphs showing the size distribution of the plate-type primary particles constituting the secondary particles of a nickel-based active material prepared according to Example 1 in terms of the length, thickness, and length-to-thickness ratio of the plate-type primary particles, respectively, at the surface of a secondary particle of the nickel-based active material, as measured in FIG. 15A.
Figure 17B:
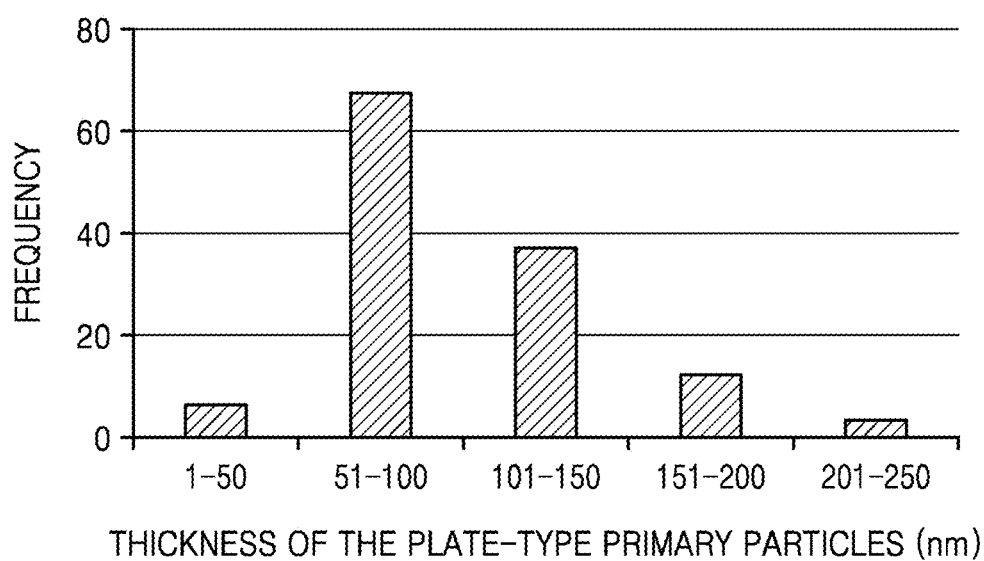
Figure 17C:
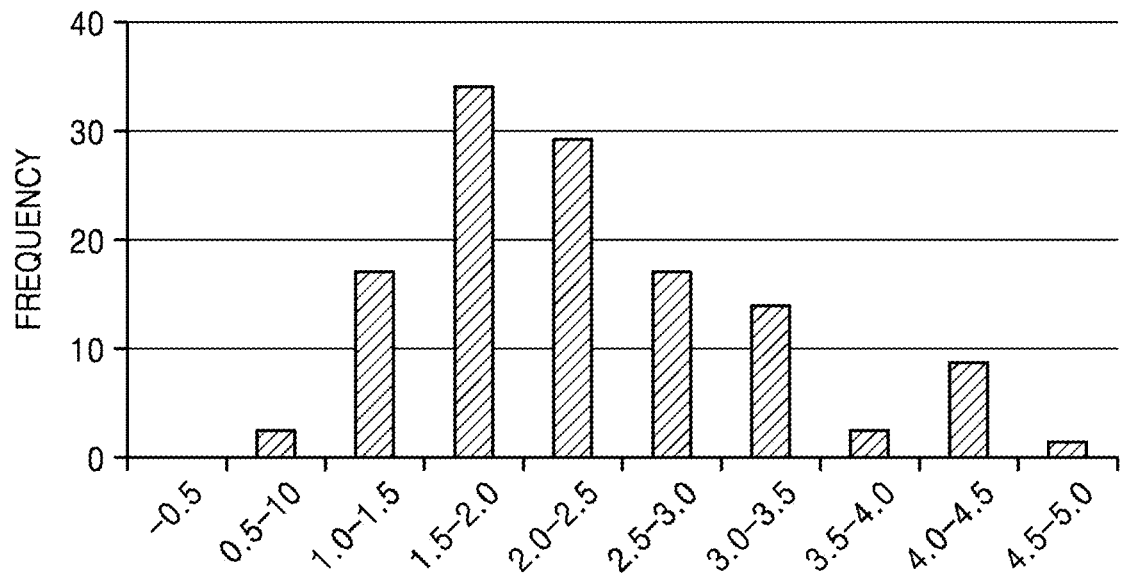
Figure 17D:
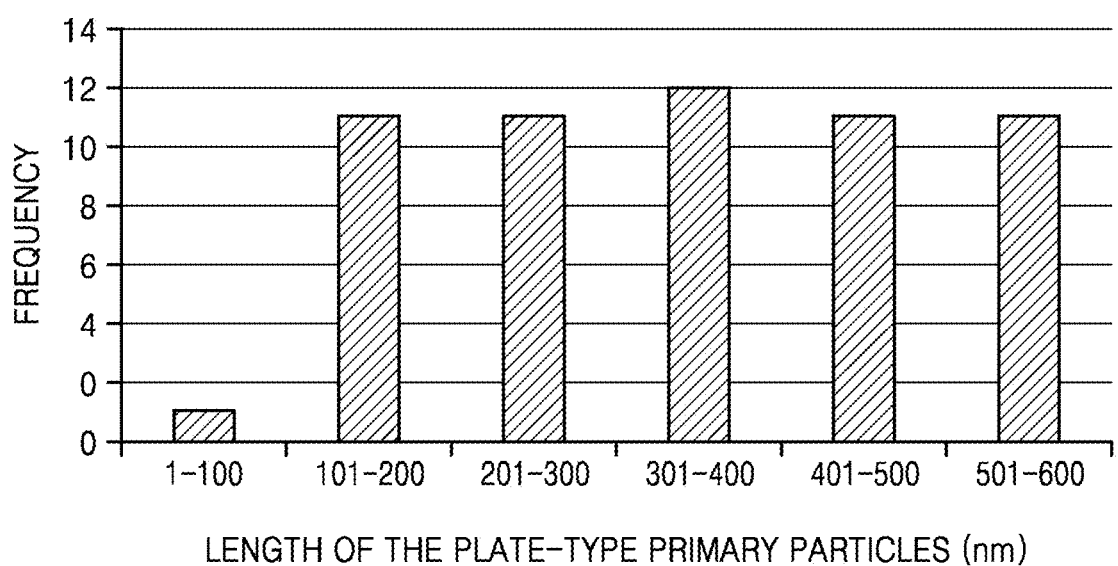
FIGS. 17D-17F are graphs showing the size distribution of the plate-type primary particles constituting the secondary particles of a nickel-based active material prepared according to Example 1 in terms of the length, thickness, and length-to-thickness ratio of the plate-type primary particles, respectively, at a cross-section of a secondary particle of the nickel-based active material, as measured in FIG. 15B.
Figure 17E:
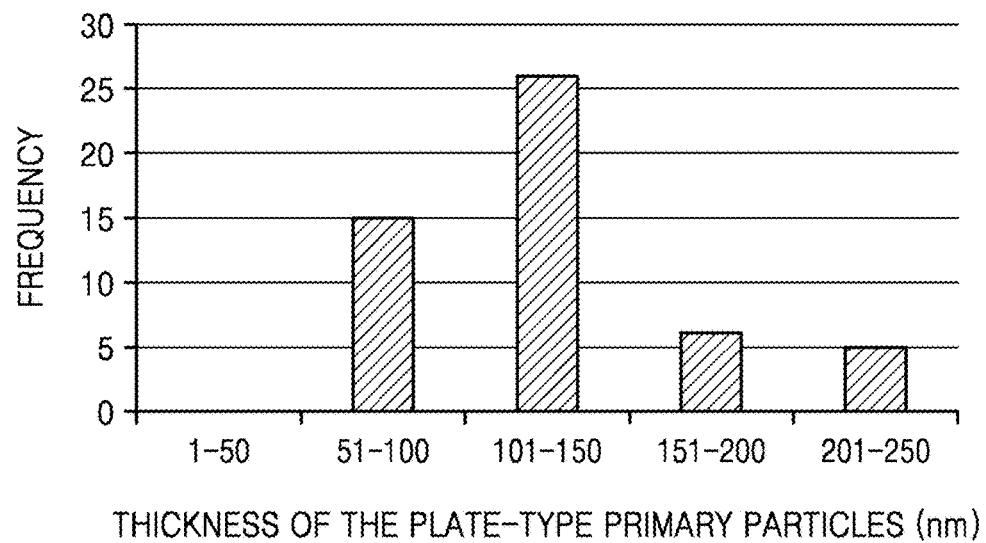
Figure 17F:
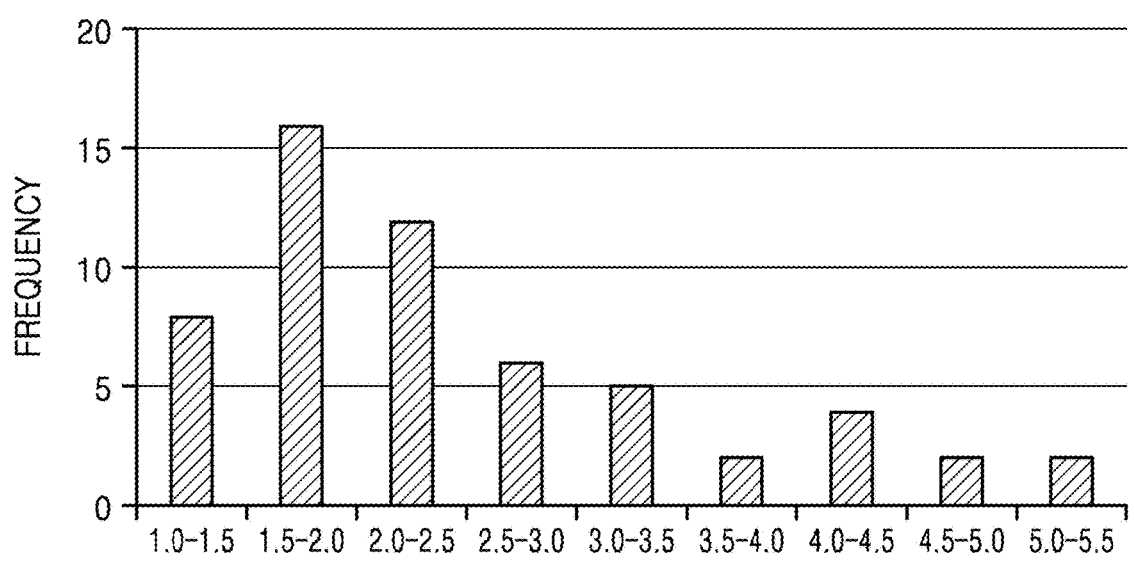

Referring to the orientations of the plate particles observed in the SEM images in FIGS. 15A and 15B, an average length, an average thickness, an and average ratio (average length/average thickness) of the plate particles were calculated. The calculation results are shown in Table 1 and FIGS. 17A-17F. FIGS. 17A-17C are graphs showing the size distribution with respect to the length direction and thickness direction of the plate primary particles on the surface of the secondary particle of the nickel-based active material, as shown in FIG. 15A, and FIGS. 17D-17F are graphs showing the size distribution with respect to the length direction and thickness direction of the plate primary particles on the cross-section of the secondary particle of the nickel-based active material, as shown in FIG. 15B.

TABLE 1

| | Surface | | Cross section |
|---|---|---|---|
| Average length (nm) | 290 | Average length (nm) | 360 |
| Average thickness (nm) | 130 | Average thickness (nm) | 150 |
| Average ratio | 2.3 | Average ratio | 2.9 |

Evaluation Example 2: X-Ray Diffraction (XRD) Analysis

X-ray diffraction (XRD) analysis was performed on the secondary particle of the nickel-based active materials of Example 1, Reference Example 1, and Comparative Example 1. The full width at half maximum (FWHM) values of peaks corresponding to the (003) planes (i.e., peaks at Bragg angle 2θ of about 18.6°), peaks corresponding to the (104) planes (i.e., peaks at Bragg angle 2θ of about 44.4°), peaks corresponding to the (018) planes (i.e., peaks at Bragg angle 2θ of about 64.4°), and peaks corresponding to the (110) planes (i.e., peaks at Bragg angle 2θ of about 65.0°) were examined.

The X-ray diffraction analysis was performed using an X'pert Pro (manufactured by PANalytical, Almelo, Netherlands) utilizing Cu-Kα radiation (1.54056 Å)

The FWHM values of peaks corresponding to the (003) planes, the (104) planes, the (018) planes, and the (110) planes at Bragg angle 2θ are compared in FIGS. 4A to 4D, respectively.

In this regard, it was confirmed that the FWHM values of the peaks corresponding to the (003), (104), (018), and (110) planes were larger (wider) for the secondary particles of the nickel-based active material of Example 1 compared to the secondary particles of the nickel-based active material of Comparative Example 1. Accordingly, it was confirmed that the particle size of the secondary particle of the nickel-based active material of Example 1 was smaller than that of the secondary particle of the nickel-based active material of Comparative Example 1.

In addition, it was confirmed via the increased FWHM values of XRD peaks in the secondary particle of the nickel-based active material of Example 1 compared to those of Reference Example 1 that the growth (e.g., size) of the primary particles was suppressed by the hetero-element compound at the grain boundary between the primary particles during the second heat treatment process.

Evaluation Example 3: BET Surface Area

The surface areas of the secondary particles of the nickel-based active material including a zirconium oxide coating prepared according to Example 1 and the nickel-based active material prepared according to Reference Example 1 were measured using a BET method, and the results are shown in Table 2.

TABLE 2

| | Surface area of product of first heat treatment (m²/g) | Surface area of product of second heat treatment (m²/g) |
|---|---|---|
| Example 1 | 0.38 | 0.34 |
| Reference Example 1 | 0.38 | 0.36 |

Referring to Table 2, it was confirmed that the secondary particles of the nickel-based active material including a zirconium oxide coating prepared according to Example 1 were densified during the second heat treatment, so that pores were blocked by the hetero-atom compounds between the primary particles. In this regard, it was confirmed that the specific surface area of the secondary particles of the nickel-based active material was reduced compared to that of the product of the first heat treatment (formed prior to zirconium oxide coating).

In Table 2, it can be seen that the secondary particles of the nickel-based active material of Reference Example 1 (prepared in the same manner as in Example 1, except that zirconium oxide was not mixed with the nickel-based active material) were also densified during the second heat treatment, so that the surface area of the product of the second heat treatment was reduced compared to the product of the first heat treatment. However, the densification was less than in the secondary particles of the nickel-based active material of Example 1. As such, it was confirmed that the zirconium oxide coating assisted the densification of the secondary particle of the nickel-based active material prepared according to Example 1. For example, zirconium oxide between the primary particles reduced the pore sizes, thereby further reducing the surface area of the secondary particles of the nickel-based active material prepared according to Example 1, compared to the secondary particles of the nickel-based active material prepared according to Reference Example 1.

Evaluation Example 4: Charging and Discharging Characteristics (Initial Efficiency)

1) Example 5 and Comparative Example 3

The coin cells of Example 5 and Comparative Example 3 were charged and discharged once at 0.1 C to perform a formation process. Then, the coin cells were charged and discharged once at 0.2 C to generate an initial charge/discharge cycling curve, shown in FIG. 5. As the coin cells were repeatedly charged and discharged at 1 C for 50 times, the charging and discharging characteristics were observed. Charging and discharging were carried out in constant current (CC) mode, up to a voltage of 4.3 V for charging and down to 3.0 V for discharging, then changed in constant voltage (CV) with a cut-off current of 0.05 C (e.g., CC–CV cycling).

(1) Initial Charging Efficiency (I.C.E)

The initial charging and discharging efficiency was measured according to Equation 1:

Initial charging and discharging efficiency [%]=[1$^{st}$ cycle discharging capacity/1$^{st}$ cycle charging capacity]×100    Equation 1

The initial charging and discharging efficiencies of the coin cells of Example 5 and Comparative Example 3 were measured, and the results are shown in Table 3.

TABLE 3

| | Charging capacity (mAh/g) | Discharge capacity (mAh/g) | I.C.E (%) |
|---|---|---|---|
| Example 5 | 197.1 | 188.3 | 95.5 |
| Comparative Example 3 | 197.4 | 179.3 | 90.8 |

Referring to Table 3, it was confirmed that the coin cell of Example 5 had improved initial charging and discharging efficiency compared to the coin cell of Comparative Example 3.

2) Examples 17 to 26

The charging and discharging efficiencies of the coin cells of Examples 17 to 26 were measured and evaluated in the same manner as in Example 5.

As a result of the evaluation, it was confirmed that the coin cells of Examples 17 to 26 had excellent charging and discharging efficiencies, equivalent to that of the coin cell of Example 5.

Evaluation Example 5: Charging and Discharging Characteristics (Rate Performance)

Figure 5:
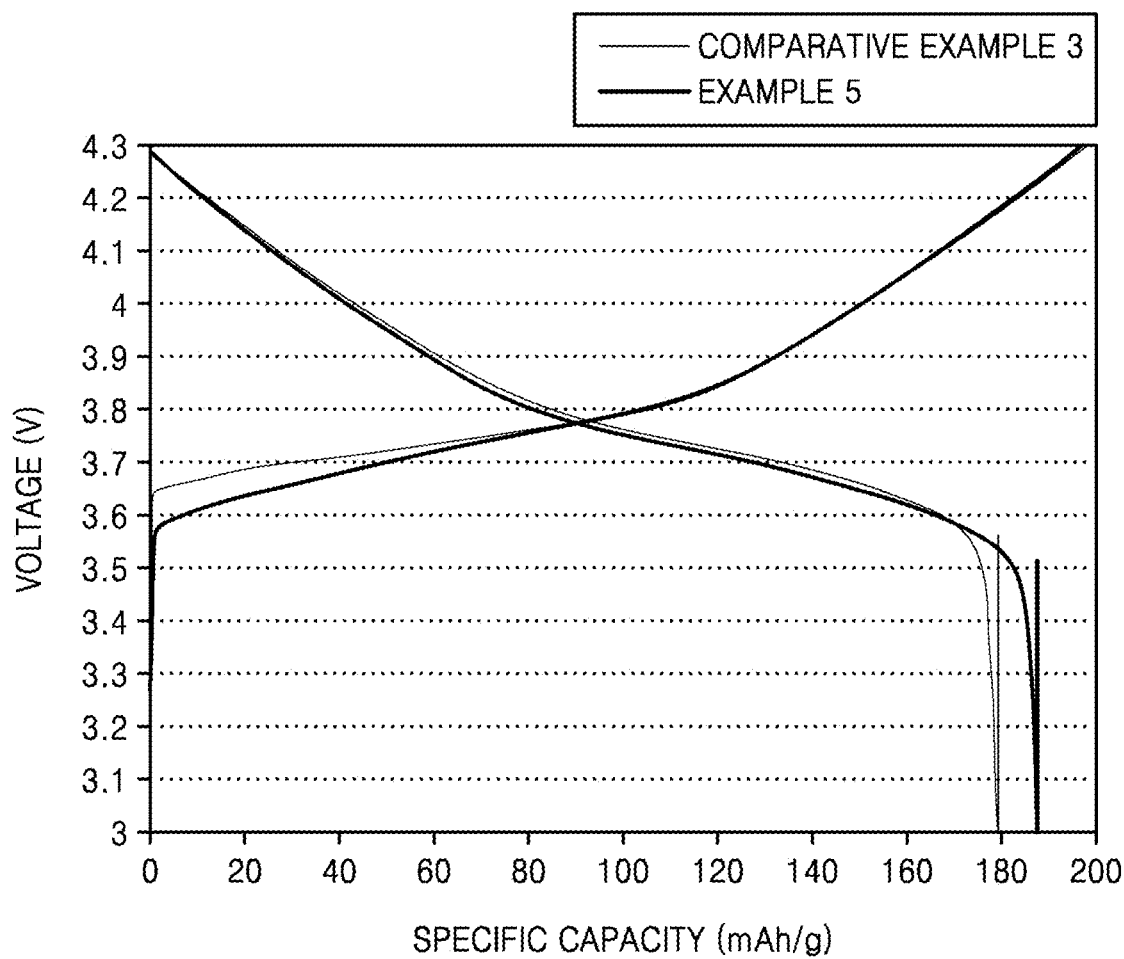
FIG. 5 is a graph showing voltage-capacity charge/discharge curves for coin cells prepared according to Example 5 and Comparative Example 3.

The coin cells of Example 5 and Comparative Example 3 were charged at a constant current (0.2 C) and a constant voltage (4.3 V, 0.05 C cut-off), rested for 10 minutes, and then discharged at a constant current (0.2 C, 0.33 C, 0.5 C, 1 C, 2 C, or 3 C) until the voltage reached 3.0 V. That is, as the number of charging and discharging cycle increased, the discharge rate was periodically changed to 0.2 C, 0.33 C, 0.5 C, 1 C, 2 C, or 3 C to evaluate the rate capability of each of the coin cells of Example 5 and Comparative Example 3. Here, during the 1$^{st}$ through 3$^{rd}$ charging and discharging cycles, the coin cells were each discharged at a rate of 0.1 C, and the rate capability thereof is shown in FIG. 5. The rate capability (e.g., with respect to 0.1 C) was measured according to Equation 2.

High-rate discharging capability (%)=(discharging capacity when a cell is discharged at a specific constant current)/(discharging capacity when a cell is discharged at a rate of 0.1 C)×100     Equation 2

Rate capability results are shown in Table 4.

TABLE 4

| | Rate-dependent capacity/capacity at 0.1 C(%) | | | | | |
|---|---|---|---|---|---|---|
| | 0.2 C | 0.33 C | 0.5 C | 1 C | 2 C | 3 C |
| Example 5 | 98.6 | 97.2 | 96.0 | 93.3 | 90.1 | 88.1 |
| Comparative Example 3 | 98.1 | 96.5 | 95.0 | 92.3 | 89.3 | 87.3 |

Referring to Table 4, was confirmed that the coin cell of Example 5 had improved high-rate discharging capabilities, compared to the coin cell of Comparative Example 3.

In addition, referring to FIG. 5, it was confirmed that the resistance to lithium diffusion was significantly reduced in a low voltage range of the coin cell of Example 5 (compared to the coin cell of Comparative Example 3) so that an actual discharging capacity of the coin cell of Example 5 was greatly improved with respect to the same charging capacity (with the same transition metal composition).

Evaluation Example 6: High-Temperature Lifespan

Example 5, Reference Example 2, and Comparative Examples 3 and 4

The high-temperature lifespans of the coin cells of Example 5, Reference Example 2, and Comparative Examples 3 and 4 were evaluated as follows.

First, the coin cells of Example 5, Reference Example 2, and Comparative Examples 3 and 4 were charged and discharged once at 0.1 C to perform a formation process. Then, the coin cells were charged and discharged once at 0.2 C to identify initial (baseline) charging and discharging characteristics. The coin cells were repeatedly charged and discharged at 1 C for 50 times, and the charging and discharging characteristics were observed. During charging, the charging begin in a constant current (CC) mode, and then, the mode was changed into a constant voltage (CV) mode which is set to cut off at 0.05 C and 4.3 V; and during discharging, the cut-off was set at 3.0 V in a CC mode The changes in discharge capacity over repeated cycles are shown in FIG. 6.

Figure 6:
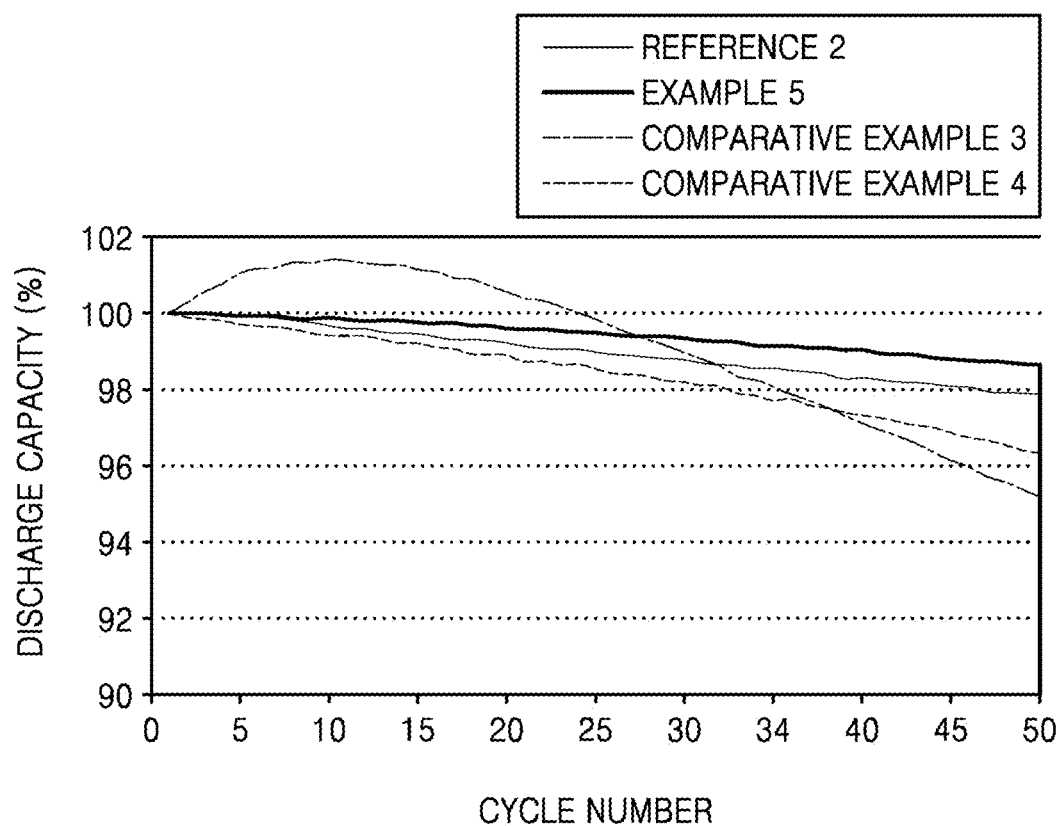
FIG. 6 is a graph showing changes in discharge capacity with respect to charge/discharge cycle number for coin cells prepared according to Example 5, Reference Example 2, Comparative Example 3, and Comparative Example 4.

Referring to FIG. 6, it was confirmed that the coin cells of Example 5 and Reference Example 2 had significantly improved high-temperature lifespan characteristics compared to the coin cells of Comparative Examples 3 and 4. In addition, when comparing the coin cells of Example 5 and Reference Example 2, it was confirmed that the coating at the grain boundary of the primary particle additionally improved the lifespan characteristics.

Evaluation Example 7: Lithium Diffusion

The lithium diffusion was evaluated by determining the lithium diffusion constants for coin cells of Examples 5 and 6 and Comparative Examples 3 and 4 using an VMP3 battery cycler (manufactured by Bio-Logic, Seyssinet-Pariset, France). Lithium diffusion constants were determined by measuring the time-dependent voltage decay upon application of a current pulse according to Galvanostatic Intermittent Titration Technique (GITT).

Figure 8:
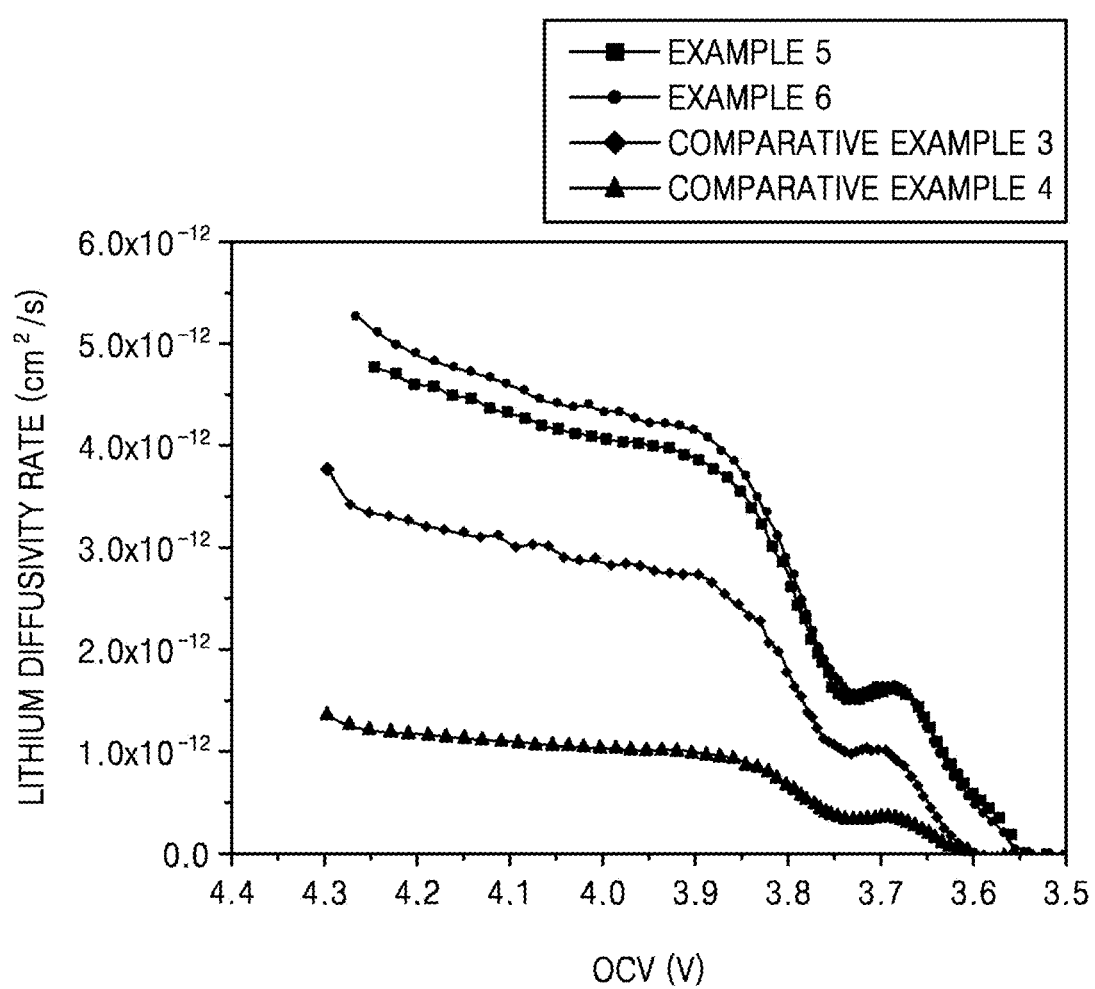
FIG. 8 is a graph showing variations in lithium diffusion constant with respect to open circuit voltage (e.g., as a stand-in for state of charge) for coin cells prepared according to Examples 5 and 6 and Comparative Examples 3 and 4.

The results of the lithium diffusion measurements are shown in FIG. 8 In FIG. 8, the expression "OCV" refers to the open circuit voltage (e.g., as a stand-in for state of charge) of the battery.

Referring to FIG. 8, it was confirmed that the coin cells of Examples 5 and 6 showed significantly higher lithium diffusion constants compared to the coin cells of Comparative Examples 3 and 4.

Evaluation Example 8: Powder Conductivity

The powder conductivity of the secondary particles of the nickel-based active material ($LiNi_{0.6}Co_{0.2}Mn_{0.2}O_2$—$ZrO_2$) of Example 1 and the secondary particles of the nickel-based active material ($LiNi_{0.6}Co_{0.2}Mn_{0.2}O_2$) of Comparative Example 1 was evaluated.

The powder conductivity was measured by pelletizing the powder under various pressures and measuring the surface resistance of the pellets. Here, the surface resistance was measured by using a LORESTA-GP (manufactured by MITSUBISHI, Tokyo, Japan), and the results are shown in FIG. 7.

Figure 7:
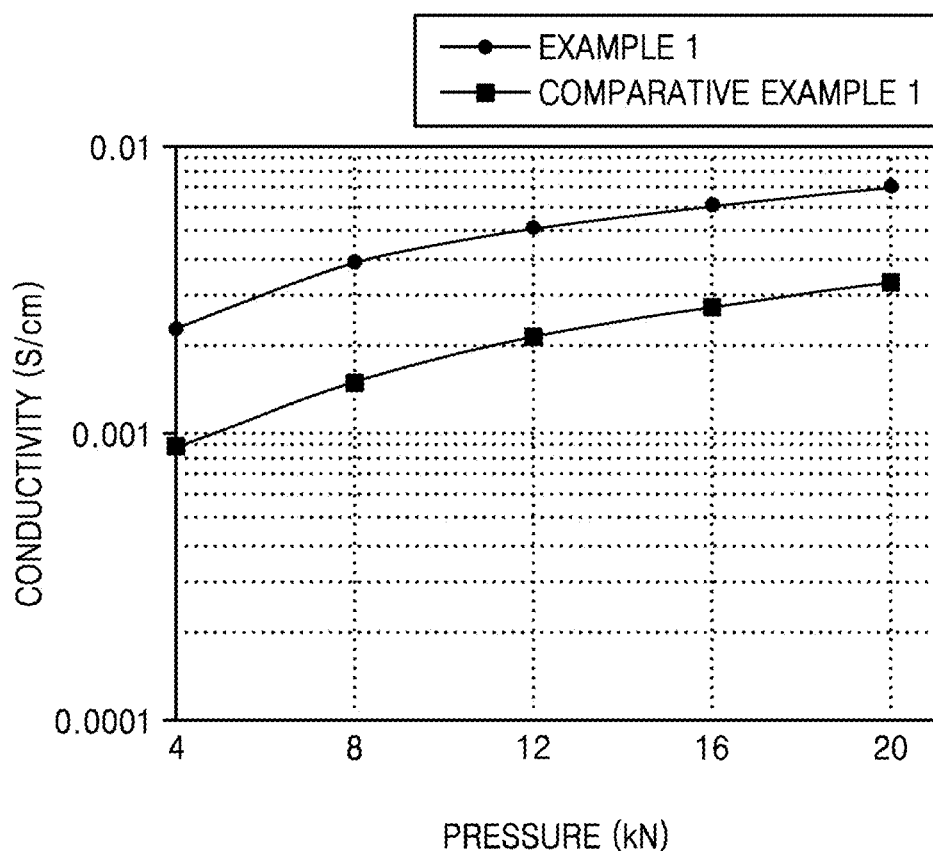
FIG. 7 is a graph showing the conductivity of powders of primary particles of nickel-based positive active materials prepared according to Example 1 and Comparative Example 1 with respect to the pelletizing pressure.

Referring to FIG. 7, it was confirmed that the secondary particle of the nickel-based active material of Example 1 had relatively a higher conductivity than the secondary particles of the nickel-based active material of Comparative Example 1 at every pellet pressure.

Evaluation Example 9: Analysis of Pore Size

The average size of the open pores in the secondary particles of the nickel-based active material of Example 1 was measured by a BET method.

Figure 12:
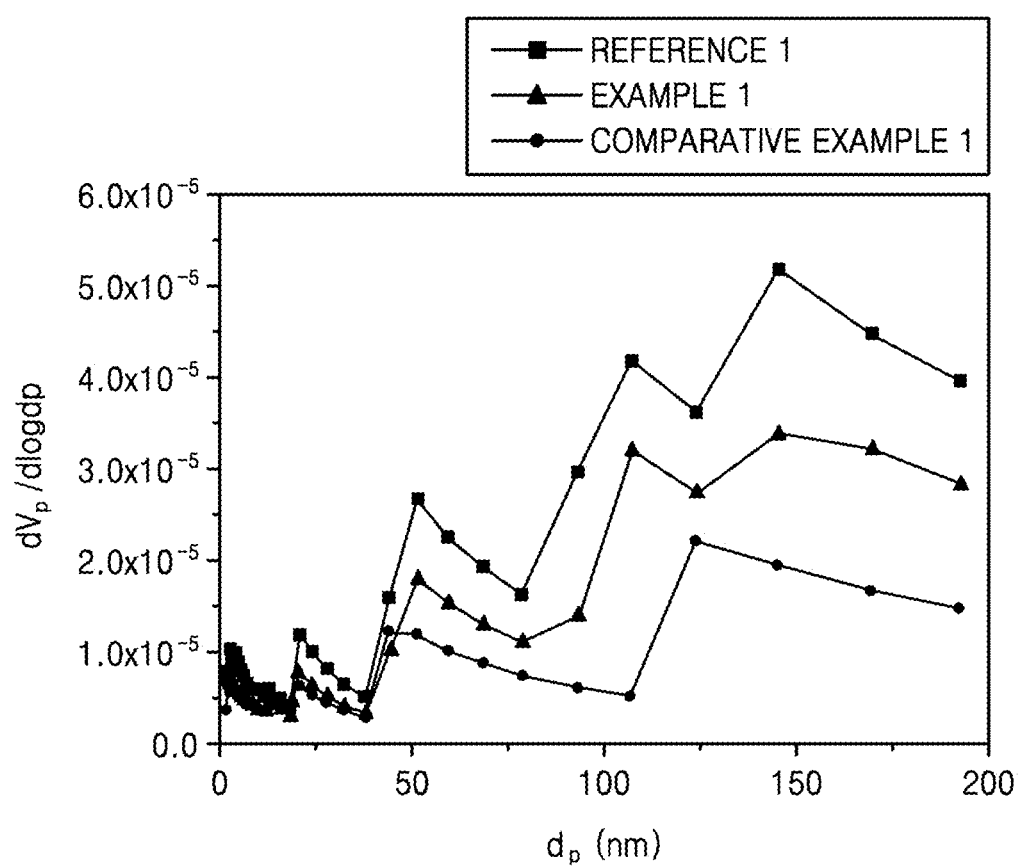
FIG. 12 shows pore-size analysis results for nickel-based active materials prepared according to Example 1, Comparative Example 1, and Reference Example 1.

The results of the analysis of the pore size are shown in Table 5 and FIG. 12. In Table 5, the results are provided to compare the secondary particles of the nickel-based active material of Example 1 with those of Reference Example 1 and Comparative Example 1. In FIG. 12, the term "$d_p$" indicates an average pore size.

TABLE 5

| | Average pore size (nm) pore size) (nm) |
|---|---|
| Reference Example 1 | 20.862 |
| Example 1 | 19.791 |
| Comparative Example 1 | 14.87 |

Referring to FIG. 12 and Table 5, it was confirmed that the secondary particle of the nickel-based active material of Example 1 had a porous structure with developed micropores. In addition, in comparison with the secondary particle of the nickel-based active material of Reference Example 1, it was confirmed that zirconium oxide between the primary particles of the secondary particle of the nickel-based active material of Example 1 reduced the surface area.

Evaluation Example 10: Cross Section of Positive Electrode after High-Temperature Lifespan Test Cross-sections of the positive electrodes used in the coin cells of Example 5 and Comparative Examples 3 and 4 were observed using the above-described Magellan 400L SEM before and after performing the high-temperature lifespan test according to Evaluation Example 6. A pretreatment was performed on a sample cross-section by milling using a JEOL CP2 for 4 hours at a voltage of 6 kV and a current of 150 uA Then, the electron scanning analysis was performed under the conditions of 3.1 pA SE FIGS. 13A to 13C are SEM images of cross-sections of the positive electrodes of Example 5 and Comparative Example 3 and 4, respectively, after the high-temperature lifespan test was performed according to Evaluation Example 6.

Figure 13A:
FIGS. 13A-13C are SEM images of a cross-section of a positive electrode after a high-temperature lifespan test is performed on coin cells of Example 5, and Comparative Example 3 and 4 according to Evaluation Example 6, respectively.

Referring to FIG. 13A, it was confirmed that, in the coin cell of Example 5, few cracks were formed even after performing the high-temperature lifespan test.

Figure 13B:
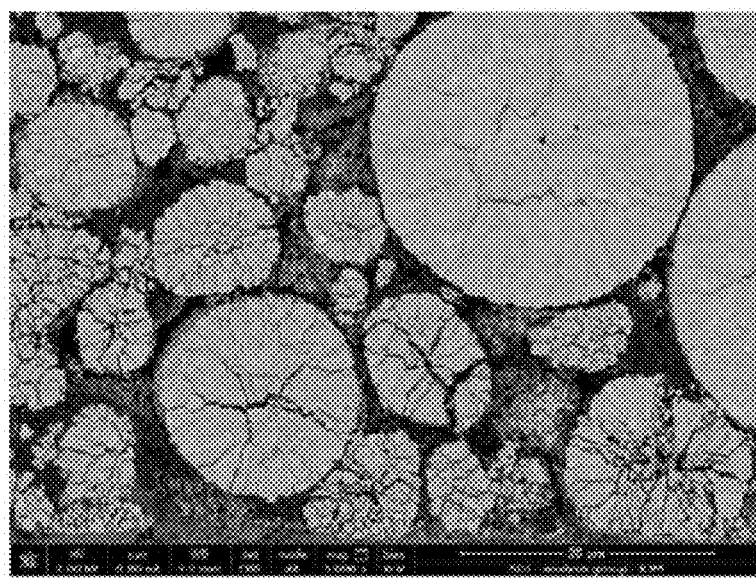
Figure 13C:
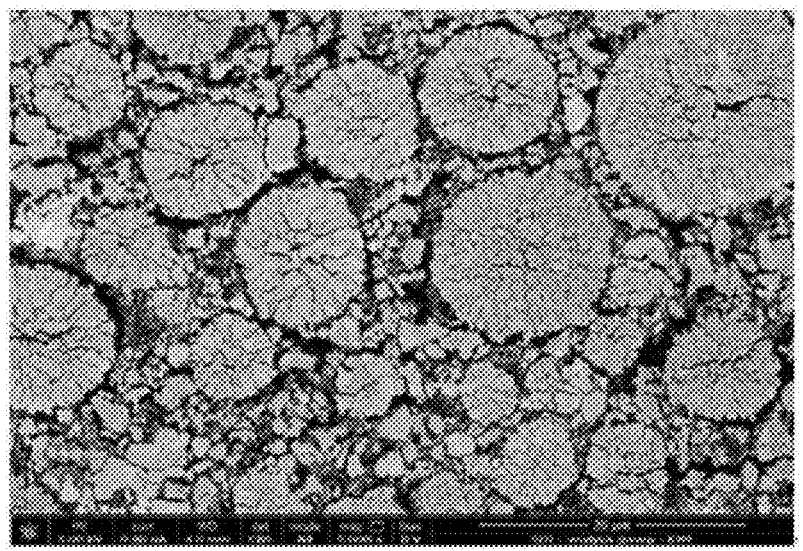

However, referring to FIGS. 13B and 13C, it was confirmed that, in the coin cells of Comparative Examples 3 and 4, cracks were formed in most of the primary particles after performing the high-temperature lifespan test.

Evaluation Example 11: Impedance (Resistance) Analysis after High-Temperature Lifespan Test The coin cells of Example 5, Reference Example 2, and Comparative Examples 3, 4, and 8 were evaluated by analyzing the cell impedance before and after performing the high-temperature lifespan test according to Evaluation Example 6. The results of the impedance analysis (Nyquist plot) after performing the high-temperature lifespan test according to Evaluation Example 6 are shown in FIG. 14.

Figure 14:
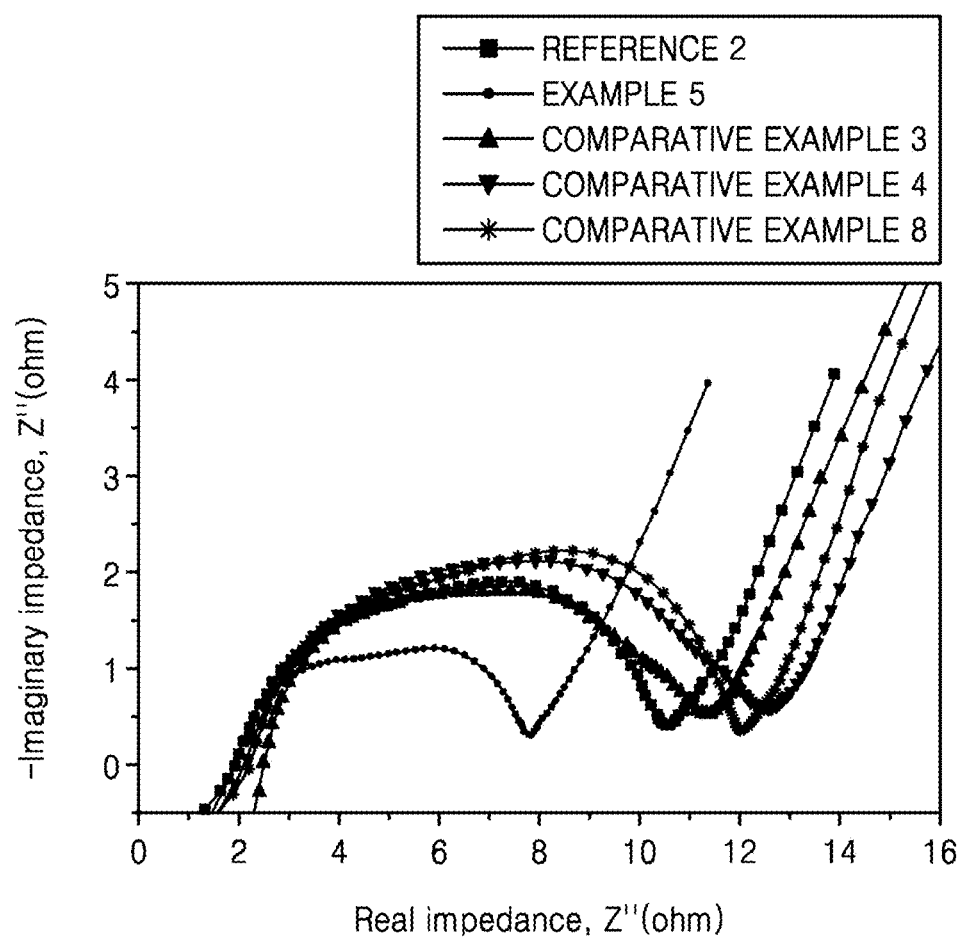
FIG. 14 is an impedance (Nyquist) plot for coin cells manufactured according to Example 5, Reference Example 2, and Comparative Example 3, 4, and 8 after the high-temperature life test of the Evaluation Example 6 is performed on each.

Referring to FIG. 14, it was confirmed that the coin cell of Example 5 showed a relatively small semicircle in the impedance plot after being subjected to the high-temperature lifespan test. However, the coin cells of Comparative Examples 3, 4, and 8 showed relatively larger semicircles in their impedance plots, demonstrating that the resistance of the coin cells was significantly increased, for example due to cracks generated therein.

In addition, based on the results of the impedance analysis obtained after performing the high-temperature lifespan test on the coin cells of Example 5 and Reference Example 2, it was confirmed that, due to the coating at the grain boundary of the primary particle, the area of grain boundary directly exposed to the electrolyte was reduced, thereby reducing the increase of the resistance.

Evaluation Example 12: Porosity Evaluation Using Scanning Electron Microscopy

The secondary particle B of the nickel-based active material of Examples 1 and 2 was analyzed using the above-described Magellan 400L SEM. A pretreatment was performed on a sample cross-section by milling using a JEOL CP2 for 4 hours at a voltage of 6 kV and a current of 150 uA Then, the electron scanning analysis was performed under the conditions of 3.1 pA SE.

Figure 16A:
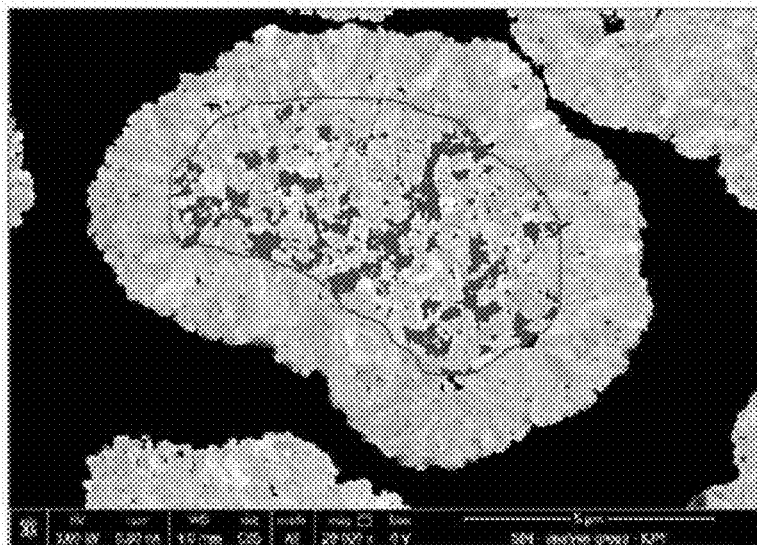
FIG. 16A is an SEM image of a cross-section of a secondary particle of a nickel-based active material prepared according to Example 1. The grey line circumscribes the inner portion of the particle, and the shaded regions within that grey line indicate the pores in this inner portion.
Figure 16B:
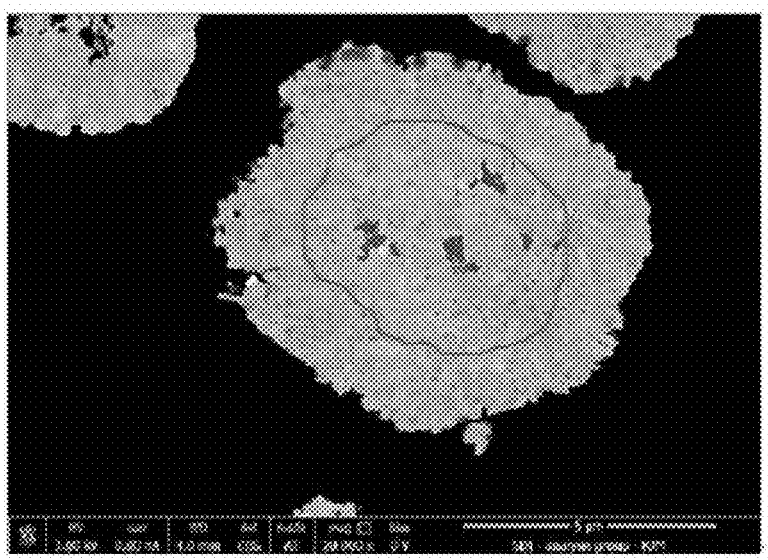
FIG. 16B is an SEM image of a cross-section of a secondary particle of a nickel-based active material prepared according to Example 2. The grey line circumscribes the inner portion of the particle, and the shaded regions within that grey line indicate the pores in this inner portion.

The results of the analysis are shown in Table 7 and FIGS. 16A and 16B.

FIG. 16A shows an SEM image of a cross-section of a secondary particle B of the nickel-based active material (LiNi$_{0.6}$Co$_{0.2}$Mn$_{0.2}$O$_2$) prepared according to Example 1.

FIG. 16B shows an SEM image of a cross-section of a secondary particle B of the nickel-based active material (LiNi$_{0.6}$Co$_{0.2}$Mn$_{0.2}$O$_2$) prepared according to Example 2. In FIGS. 16A and 16B, the area inside the grey line is an internal (inner) portion while the area outside the grey line is an exterior (outer) portion. Further, the shaded regions in the inner portion correspond to pores.

TABLE 7

|  |  | Particle fraction (%) | Porosity fraction (%) |
|---|---|---|---|
| Example 1 | Overall | 92.7 | 7.3 |
|  | Inner portion | 83.5 | 16.5 |
|  | Outer portion | 99.3 | 0.7 |
| Example 2 | Overall | 98.5 | 1.5 |
|  | Inner portion | 96.7 | 3.3 |
|  | Outer portion | 99.7 | 0.3 |

The particle fraction refers to a ratio of an area occupied by particles to a total area, and the porosity fraction refers to a ratio (%) of an area occupied by pores to a total area of the particle cross-section.

Referring to Table 7, it was confirmed that the secondary particle of the nickel-based active material of each of Examples 1 and 2 showed higher porosity in the inner portion than that in the outer portion, and had a porous structure with developed pores.

As described above, when a nickel-based active material for a lithium secondary battery is used, the influence (effects) of grain boundary exposure upon the crack formation may be minimized while the effects of particle contact may be exhibited, thereby manufacturing a lithium secondary battery having improved capacity, efficiency, and lifespan.

As used herein, the terms "use", "using", and "used" may be considered synonymous with the terms "utilize", "utilizing", and "utilized", respectively. Further, the use of "may" when describing embodiments of the present disclosure refers to "one or more embodiments of the present disclosure".

As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the drawings, it will be understood by those of ordinary skill in the art that various changes in form and details may be made therein without departing from the scope as defined by the following claims and equivalents thereof.

What is claimed is:

1. A nickel-based active material for a lithium secondary battery, the nickel-based active material comprising:
   at least one secondary particle comprising an aggregate of plate-shaped primary particles arranged to have a radially aligned outer portion and an irregularly aligned inner portion, the irregularly aligned inner portion having a plurality of pores distributed throughout, and
   a hetero-element compound on the plate-shaped primary particles.

2. The nickel-based active material of claim 1, wherein the hetero-element compound is included along a grain boundary of adjacent primary particles and/or on a surface of a primary particle.

3. The nickel-based active material of claim 1, wherein the hetero-element is at least one selected from zirconium (Zr), titanium (Ti), aluminum (Al), magnesium (Mg), tungsten (W), phosphorus (P), and boron (B).

4. The nickel-based active material of claim 3, wherein the hetero-element compound further comprises lithium (Li).

5. The nickel-based active material of claim 3, wherein an amount of the at least one hetero-element of the hetero-element compound is about 0.0005 mol to about 0.03 mol based on 1 mol of transition metals of the nickel-based active material.

6. The nickel-based active material of claim 1, wherein a pore size of the inner portion is larger than a pore size of the outer portion.

7. The nickel-based active material of claim 6, wherein the pore size of the inner portion is about 150 nm to about 1 μm, and the pore size of the outer portion is less than 150 nm.

8. The nickel-based active material of claim 6, wherein the secondary particle further comprises an open pore having a pore size of less than 150 nm toward the inner portion.

9. The nickel-based active material of claim 1, wherein the plate-shaped primary particles in the outer portion each have a long axis arranged in a radial direction.

10. The nickel-based active material of claim 9, wherein the plate-shaped primary particles each have an average length of about 150 nm to about 500 nm, an average thickness of about 100 nm to about 200 nm, and a length-to-thickness ratio of about 1:2 to about 1:10.

11. The nickel-based active material of claim 1, wherein the nickel-based active material of the at least one secondary particle is represented by Formula 1:

$$Li_a(Ni_{1-x-y-z}Co_xMn_yM_z)O_2 \qquad \text{Formula 1}$$

wherein, in Formula 1, M is at least one element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), and a, x, y, and z satisfy the following relations: $0.95 \leq a \leq 1.3$, $x \leq (1-x-y-z)$, $y \leq (1-x-y-z)$, $0 < x < 1$, $0 \leq y < 1$, and $0 \leq z < 1$.

12. The nickel-based active material of claim 1, wherein the nickel-based active material is $LiNi_{0.6}Co_{0.2}Mn_{0.2}O_2$, $LiNi_{0.5}Co_{0.2}Mn_{0.3}O_2$, $LiNi_{0.33}Co_{0.33}Mn_{0.33}O_2$, $LiNi_{0.8}Co_{0.1}Mn_{0.1}O_2$, or $LiNi_{0.85}Co_{0.1}Al_{0.05}O_2$.

13. A lithium secondary battery comprising:
   a positive electrode comprising the nickel-based active material of claim 1;
   a negative electrode; and
   an electrolyte between the positive electrode and the negative electrode.

14. A method of preparing a nickel-based active material of claim 1, the method comprising:
   obtaining a nickel-based active material A by performing a first heat treatment on a mixture of a lithium precursor and metal hydroxide in an oxidative gas atmosphere; and
   mixing a raw material containing the nickel-based active material A and a heteroelement and performing a second heat treatment thereon,
   wherein a temperature at which the second heat treatment is performed is higher than a temperature at which the first heat treatment is performed, and
   the prepared nickel-based active material comprises at least one secondary particle comprising an aggregate of two or more primary particles, wherein at least a portion of the secondary particle has a radial alignment structure.

15. The method of claim 14, wherein the first heat treatment is performed at 600° C. to 800° C., and the second heat treatment is performed at 700° C. to 900° C.

* * * * *